US010201122B2

(12) United States Patent
Higgins

(10) Patent No.: US 10,201,122 B2
(45) Date of Patent: Feb. 12, 2019

(54) LARGE-SCALE HELICAL FARMING APPARATUS

(71) Applicant: Kevin W. Higgins, Charlotte, NC (US)

(72) Inventor: Kevin W. Higgins, Charlotte, NC (US)

( * ) Notice: Subject to any disclaimer, the term of this patent is extended or adjusted under 35 U.S.C. 154(b) by 40 days.

(21) Appl. No.: 15/171,791

(22) Filed: Jun. 2, 2016

(65) Prior Publication Data

US 2016/0270304 A1 Sep. 22, 2016

Related U.S. Application Data

(63) Continuation-in-part of application No. 14/604,381, filed on Jan. 23, 2015.

(51) Int. Cl.
*A01G 9/14* (2006.01)
*A01C 7/20* (2006.01)
(Continued)

(52) U.S. Cl.
CPC ............ *A01C 7/20* (2013.01); *A01D 93/00* (2013.01); *A01G 9/14* (2013.01); *A01G 9/143* (2013.01);
(Continued)

(58) Field of Classification Search
CPC .......... A01G 31/02; A01G 9/022; A01G 9/12; A01G 9/14; A01G 9/143; A01G 31/04; A01G 31/042; A01G 31/047; A01G 31/06
(Continued)

(56) References Cited

U.S. PATENT DOCUMENTS

| 1,530,707 A | * | 3/1925 | Warner | B65G 17/02 |
| | | | | 198/714 |
| 3,038,314 A | * | 6/1962 | Hultman | A01K 61/00 |
| | | | | 137/625.46 |

(Continued)

FOREIGN PATENT DOCUMENTS

CN 104746933 A 7/2015

OTHER PUBLICATIONS

Cotter. Plantagon Breaks Ground on its First 'Plantscraper' Vertical Farm in Sweden. Mar. 20, 2012 [retrieved Jul. 26, 2017]. Retrieved from the internet: <URG:http://inhabitat.com/plantagon-breaks-ground-on-its-first-plantscraper-vertical-farm-in-sweden/>.

(Continued)

*Primary Examiner* — Tien Q Dinh
*Assistant Examiner* — Ebony E Evans
(74) *Attorney, Agent, or Firm* — Moore & Van Allen PLLC; Jeffrey R. Gray

(57) ABSTRACT

Embodiments of the present invention relate to systems and methods of providing a large-scale farming apparatus that utilizes a helical design for continuous crop production and cultivation. The invention generally embodies a planting material suspended between two material transport assemblies, configured to move down a helical path. In some embodiments, a depositor may deposit soil, seeds, fertilizer, etc. onto the planting material at the top of the helical path. In some embodiments, a harvester may harvest the crops at the bottom of the helical path and discard the soil into a compost housing. The material transport assemblies may travel back to the top of the helical path, creating a continuous path upon which the planting material may travel. A compost transport system may receive the compost from the compost housing, transport the compost upwards to the (Continued)

depositor, and deliver the compost, as fertile soil, back to the depositor.

20 Claims, 13 Drawing Sheets

(51) Int. Cl.
    *A01D 93/00*     (2009.01)
    *A01G 31/02*     (2006.01)
    *A01G 31/04*     (2006.01)

(52) U.S. Cl.
    CPC ........... *A01G 9/1423* (2013.01); *A01G 31/02* (2013.01); *A01G 31/04* (2013.01); *A01G 31/042* (2013.01); *Y02A 40/252* (2018.01); *Y02P 60/216* (2015.11)

(58) Field of Classification Search
    USPC .......................... 47/62 R, 39, 65, 17, 14, 83
    See application file for complete search history.

(56) References Cited

U.S. PATENT DOCUMENTS

| | | | |
|---|---|---|---|
| 3,038,587 A | 6/1962 | Bilocq | |
| 3,258,112 A * | 6/1966 | Allen | B65G 27/00 |
| | | | 198/756 |
| 3,667,591 A * | 6/1972 | Sykes | B65G 11/063 |
| | | | 198/756 |
| 3,771,258 A | 11/1973 | Charney | |
| 3,904,025 A * | 9/1975 | Garvey | B65G 21/18 |
| | | | 198/778 |
| 4,088,160 A | 5/1978 | Balmat et al. | |
| 4,258,501 A | 3/1981 | Brown | |
| 4,513,531 A | 4/1985 | Lestraden | |
| 4,798,062 A | 1/1989 | Lipinski et al. | |
| 4,858,750 A * | 8/1989 | Cawley | B65G 17/064 |
| | | | 198/778 |
| 4,879,841 A | 11/1989 | Sjostrand | |
| 5,330,401 A * | 7/1994 | Walstead | A63B 22/02 |
| | | | 198/838 |
| 5,413,213 A * | 5/1995 | Golz | A24C 5/35 |
| | | | 198/778 |
| 5,699,897 A * | 12/1997 | Svejkovsky | B65G 27/12 |
| | | | 198/750.7 |
| 5,891,001 A | 4/1999 | Carnes et al. | |
| 6,564,930 B1 | 5/2003 | Colding-Kristensen et al. | |
| 6,796,418 B1 | 9/2004 | Harrison et al. | |
| 7,331,445 B2 | 2/2008 | Roland | |
| 7,963,389 B2 | 6/2011 | Broers et al. | |
| 8,151,518 B2 | 4/2012 | Adams et al. | |
| 8,276,746 B2 | 10/2012 | Klotzki | |
| 9,004,268 B2 | 4/2015 | Olsson | |
| 2009/0265986 A1 | 10/2009 | Young | |
| 2010/0269407 A1 | 10/2010 | Prohaska | |
| 2011/0023358 A1 | 2/2011 | Marchildon | |
| 2011/0120002 A1 | 5/2011 | Pettibone | |

OTHER PUBLICATIONS

International Search Report and Written Opinion for International Patent Application No. PCT/US16/14294 dated Mar. 11, 2016.
International Preliminary Report on Patentability for International Patent Application No. PCT/US16/14294 dated Jul. 25, 2017.
International Search Report and Written Opinion for International Patent Application No. PCT/US17/35498 dated Aug. 14, 2017.

* cited by examiner

LARGE-SCALE HELICAL FARMING APPARATUS

CROSS-REFERENCE TO RELATED APPLICATION

The present application is a continuation-in-part application of, and claims priority to, U.S. patent application Ser. No. 14/604,381, which was filed Jan. 23, 2015, is titled "Large-Scale Helical Farming Apparatus," and is incorporated herein in its entirety.

TECHNICAL FIELD

This invention relates generally to farming on reduced plots of land, and more particularly to large-scale, multi-level farming apparatuses designed to increase crop production and minimize wastefulness of resources on reduced plots of land.

BACKGROUND

Increasing crop production per a plot of land while minimizing the associated costs improves crops yields. This is especially relevant in areas with limited natural and economic resources, as well as in areas with seasonal farming restrictions. In these types of areas, increasing crop yields is an important aspect of maintaining a society.

BRIEF SUMMARY

Embodiments of the present invention relate to systems and methods of providing a large-scale farming apparatus that utilizes a helical design for continuous crop production and cultivation. The invention generally embodies a planting material suspended between two material transport assemblies, configured to move down a helical path. In some embodiments, a depositor may deposit soil, seeds, fertilizer, etc. onto the planting material at the top of the helical path. In some embodiments, a harvester may harvest the crops at the bottom of the helical path and discard the soil into a compost housing. The material transport assemblies may travel back to the top of the helical path, creating a continuous path upon which the planting material may travel. A compost transport system may receive the compost from the compost housing, transport the compost upwards to the depositor, and deliver the compost, as fertile soil, back to the depositor.

In some embodiments, an apparatus for providing vertical farming structure through which crops are allowed to grow as the crops move downward is provided. The apparatus may comprise a central support member positioned at least near the center of the apparatus. In some embodiments, the apparatus comprises one or more outer support members positioned at least near the exterior of the apparatus. Likewise, in some embodiments of the invention, the apparatus comprises an inner material transport assembly operatively coupled to the central support member. In some embodiments, the apparatus comprises an outer material transport assembly operatively coupled to the outer support members. The apparatus may also comprise a planting material comprising an inner edge operatively coupled to the inner material transport assembly, an outer edge operatively coupled to the outer material transport assembly, and a body extending between the inner edge and the outer edge, and wherein the planting material is configured to support the crops as the crops grow. Finally, the apparatus may be configured with any embodiments described above, wherein the crops are planted near an apparatus top, move in the downward direction as the inner material transport assembly and outer material transport assembly allow the planting material to move in the downward direction, and are ready for harvesting near an apparatus bottom.

In some embodiments, the apparatus is formed in a helical configuration such that the inner material transport assembly and the outer material transport assembly extend the planting material in a helical configuration from the apparatus top to the apparatus bottom.

In some embodiments of the apparatus, at least one of the inner material transport assembly or the outer material transport assembly comprise first cable members, wherein the planting material comprise second cable members, wherein the first cable members and second cable members are operatively coupled by a cable in order to operatively couple at least one edge of the planting material to the inner material transport assembly or the outer material transport assembly, and wherein the cable members and the cable are configured to move the planting material in the downward direction between the inner material transport assembly and the outer material transport assembly.

In some embodiments of the apparatus, at least one of the inner material transport assembly and outer material transport assembly comprise clips, rollers, and gears operatively coupled together, and wherein the clips are operatively coupled to at least one of the inner edge or the outer edge of the planting material, and wherein the clips, the rollers, and the gears are configured to move the planting material in the downward direction between the inner material transport assembly and the outer material transport assembly.

In some embodiments, the apparatus further comprises a planting material return support extending adjacent the apparatus bottom and the apparatus top. In some embodiments of the apparatus, the planting material return support is configured to fold or bunch at least the outer edge of the planting material within the planting material return support adjacent the apparatus bottom. Furthermore, in some embodiments of the apparatus, after exiting the planting material return support adjacent the apparatus top the planting material returns to a helical orientation between the inner material transport assembly and the outer material transport assembly, thereby forming a continuous path along which the planting material travels.

In some embodiments, the apparatus further comprises a light receiver operatively coupled to the central support member, the light receiver comprising one or more solar panels. In such an embodiment, the apparatus may further comprise a cover operatively coupled to the central support member and the outer support members, the cover comprising a reflective material and configured to direct sunlight towards the light receiver. In such embodiments, the one or more solar panels are utilized to power at least a portion of the apparatus.

In some embodiments of the apparatus, the central support member comprises a conduit or is operatively coupled to a conduit. In some such embodiments, the apparatus further comprises a compost housing located adjacent the apparatus bottom and configured to receive the soil from planting material after the crops are harvested. The apparatus may further comprise a compost transport system operatively coupled to the compost housing and the conduit, wherein the compost transport system is configured to receive the soil from the compost housing. Finally, the apparatus may comprise a depositor operatively coupled to the conduit, positioned over at least a portion of the planting material, wherein the depositor is configured to receive soil from the compost transport system and deposit soil on at least a portion of the planting material.

In some embodiments, the apparatus further comprises a harvester positioned over at least a portion of the planting material, wherein the harvester is configured to harvest the crops from the planting material.

In some embodiments, the apparatus comprises a propulsive assembly operatively coupled to the inner transport assembly or the outer transport assembly, wherein the propulsive assembly is configured to move the planting material along the inner transport assembly and the outer transport assembly.

In some embodiments of the invention, the apparatus comprises a heating system operatively coupled to the apparatus and configured to provide heat throughout the planting material, or a cooling system operatively coupled to the apparatus and configured to provide cool air throughout the planting material. The apparatus may also comprise an irrigation system operatively coupled to the apparatus, wherein the irrigation system is configured to provide water throughout the planting material. In some embodiments, the apparatus also comprises a lighting system operatively coupled to the apparatus, wherein the lighting system is configured to provide artificial light to the crops. Finally, in some embodiments, the apparatus comprises a sheath positioned to surround the apparatus, wherein the sheath is configured to protect the planting material from natural elements.

According to embodiments of the invention, a method providing vertical farming structure through which crops are allowed to grow as the crops move downward is provided. The method may comprise planting seeds for crops on a planting material adjacent an apparatus top, wherein the apparatus comprises a central support member, one or more outer support members positioned at least near an exterior of the apparatus, an inner material transport assembly operatively coupled to the central support member, an outer material transport assembly operatively coupled to the outer support members, the planting material comprising an inner edge operatively coupled to the inner material transport assembly and an outer edge operatively coupled to the outer material transport assembly, and a body suspended between the inner edge and the outer edge, and wherein the planting material is configured to support the crops as the crops grow. In some embodiments, the method may comprise moving the planting material with the seeds in a downward direction as the inner material transport assembly and outer transport assembly allow the planting material to move in the downward direction, in order to allow the crops to grow. Finally, the method may comprise harvesting the crops adjacent the apparatus bottom after the crops have grown to the desired maturity.

In some embodiments of the method, the apparatus is formed in a helical configuration such that the inner material transport assembly and the outer material transport assembly extend the planting material in a helical configuration from the apparatus top to the apparatus bottom.

In some embodiments of the method, at least one of the inner material transport assembly or the outer material transport assembly comprise first cable members, wherein the planting material comprise second cable members, and wherein the first cable members and second cable members are operatively coupled by a cable in order to operatively couple at least one edge of the planting material to the inner material transport assembly or the outer material transport assembly, and wherein the cable members and the cable are configured to move the planting material in the downward direction between the inner material transport assembly and the outer material transport assembly.

In some embodiments of the method, at least one of the inner material transport assembly and outer material transport assembly comprise clips, rollers, and gears operatively coupled together, and wherein the clips are operatively coupled to at least one of the inner edge or the outer edge of the planting material, and wherein the clips, the rollers, and the gears are configured to move the planting material in the downward direction between the inner material transport assembly and the outer material transport assembly.

In some embodiments of the invention, the method further comprises returning the planting material at the apparatus bottom to the apparatus top in a continuous path through a planting material return support extending adjacent the apparatus bottom and the apparatus top. In some embodiments of the method, the planting material return support is configured to fold or bunch at least the outer edge of the planting material within the planting material return support adjacent the apparatus bottom. Finally, in some embodiments of the method, after exiting the planting material return support adjacent the apparatus top, the planting material returns to a helical orientation between the inner material transport assembly and the outer material transport assembly, thereby forming the continuous path along which the planting material travels.

In some embodiments of the method, the crops are gown with the assistance of a light receiver operatively coupled to the central support member, the light receiver comprising one or more solar panels; a cover operatively coupled to the central support member and the outer support members, the cover comprising a reflective material and configured to direct sunlight towards the light receiver; and wherein the one or more solar panels are utilized to power at least a portion of the apparatus.

In some embodiments, the method further comprises delivering soil from a compost housing located adjacent the apparatus bottom to the planting material adjacent the apparatus top through a conduit using a compost transport system and a depositor. In some embodiments of the method, the central support member comprises the conduit or is operatively coupled to the conduit. In some embodiments of the method, the compost housing is configured to receive the soil from planting material after the crops are harvested. In some embodiments of the method, the compost transport system is operatively coupled to the compost housing and the conduit, wherein the compost transport system is configured to receive the soil from the compost housing deliver the soil to the depositor. Finally, in some embodiments of the method, the depositor is operatively coupled to the conduit, positioned over at least a portion of the planting material, and wherein the depositor is configured to receive the soil from the compost transport system and deposit the soil on at least a portion of the planting material.

In some embodiments of the method, harvesting comprises harvesting through a harvester positioned over at least a portion of the planting material adjacent the apparatus bottom, wherein the harvester is configured to harvest the crops from the planting material.

In some embodiments of the method, the planting material is moved in the downward direction through a propulsive assembly operatively coupled to the inner transport assembly or the outer transport assembly, wherein the propulsive assembly is configured to move the planting material along the inner transport assembly and the outer transport assembly.

In some embodiments of the method, the crops are gown with the assistance of a heating system operatively coupled to the apparatus and configured to provide heat throughout the planting material, or a cooling system operatively coupled to the apparatus and configured to provide cool air throughout the planting material; an irrigation system operatively coupled to the apparatus, wherein the irrigation system is configured to provide water throughout the planting material; a lighting system operatively coupled to the apparatus, wherein the lighting system is configured to provide artificial light to the crops; and a sheath positioned to surround the apparatus, wherein the sheath is configured to protect the planting material from natural elements.

In further embodiments, an apparatus for a vertical farming structure through which crops are allowed to grow is provided. The apparatus may comprise a central support member positioned at least near the center of the apparatus; one or more outer support members positioned at least near the exterior of the apparatus; an inner material transport assembly operatively coupled to the central support member; an outer material transport assembly operatively coupled to the outer support members; a planting material comprising an inner edge operatively coupled to the inner material transport assembly, an outer edge operatively coupled to the outer material transport assembly, and a body extending between the inner edge and the outer edge, wherein the planting material is configured to support the crops as the crops grow; and wherein the crops are planted in a first location within the apparatus, move as the inner material transport assembly and outer transport assembly allow the planting material to move, and are ready for harvesting in a second location within the apparatus.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

Figure 1:
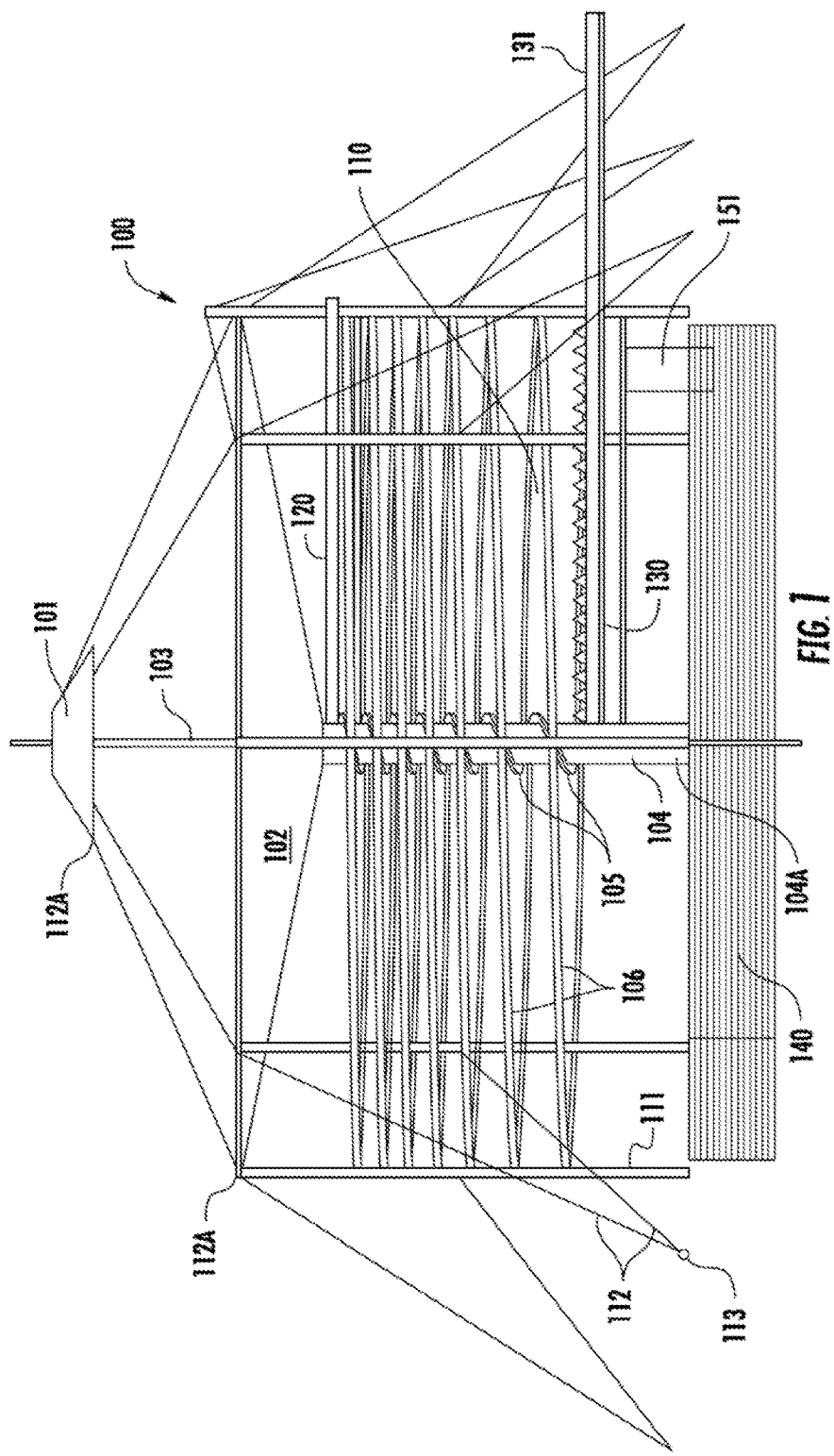

FIG. 1 illustrates a side view of a helical farming apparatus, in accordance with embodiments of the invention.

Figure 2:
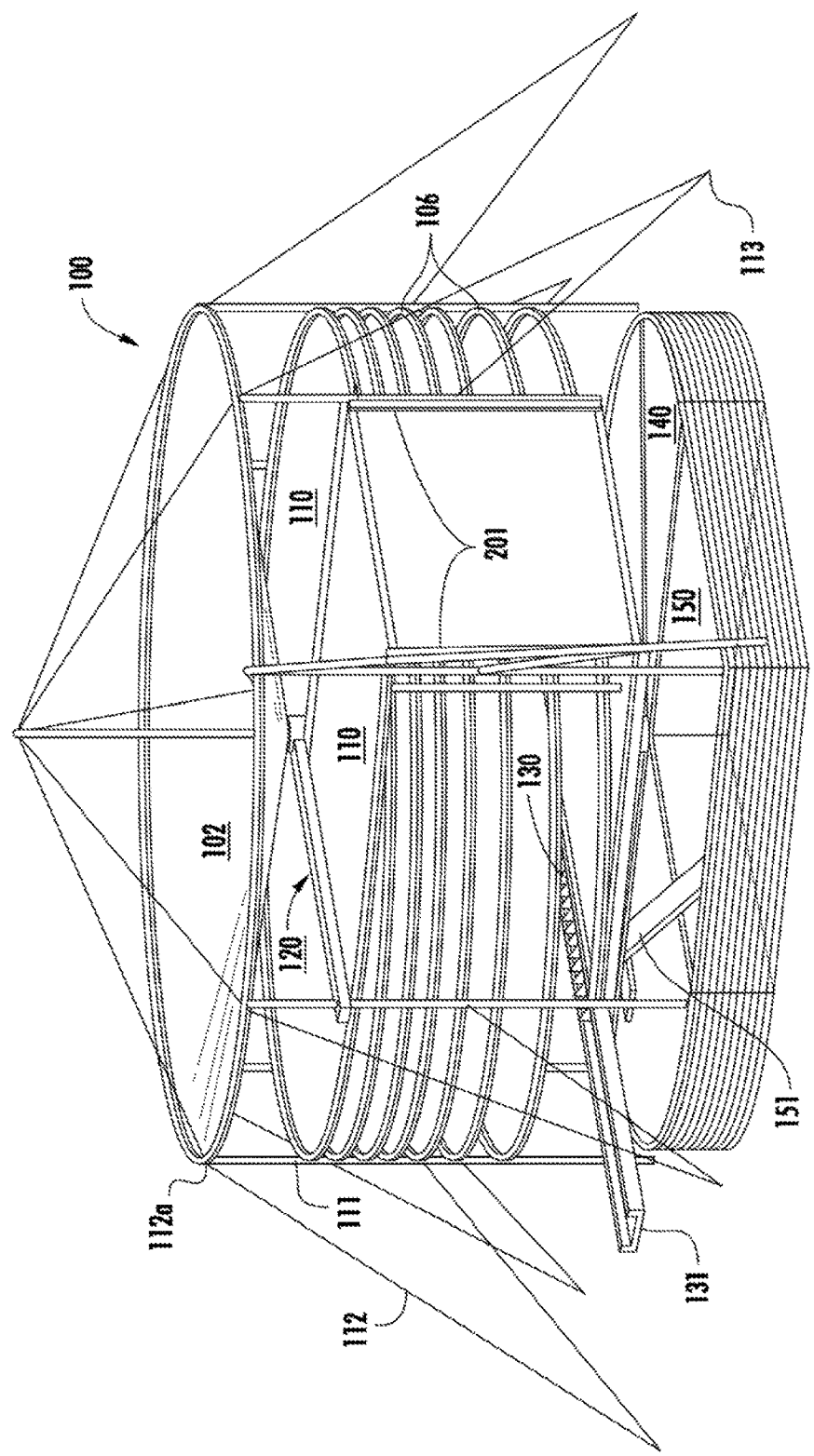

FIG. 2 illustrate a perspective view of a helical farming apparatus, in accordance with embodiments of the invention.

Figure 3:
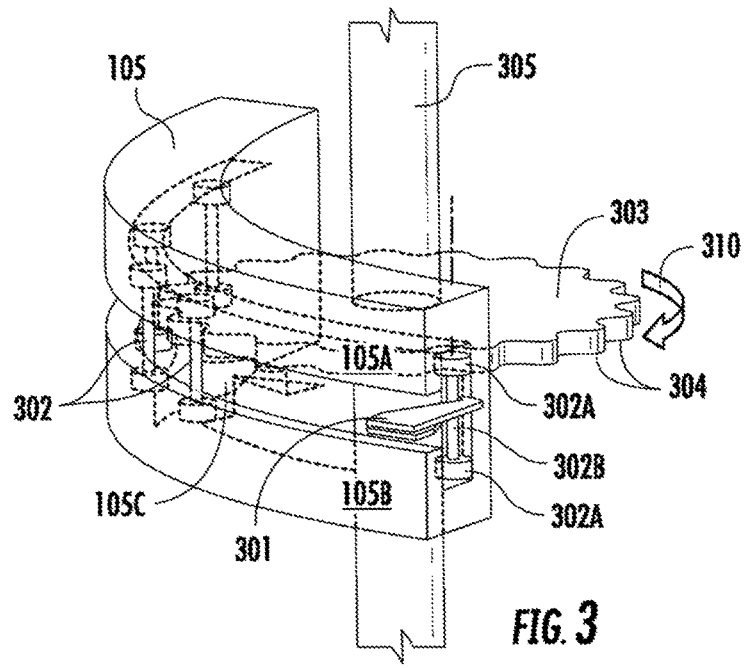

FIG. 3 illustrates a perspective view of a planting material transport device assembly that uses rollers and gears, in accordance with embodiments of the invention.

Figure 4:
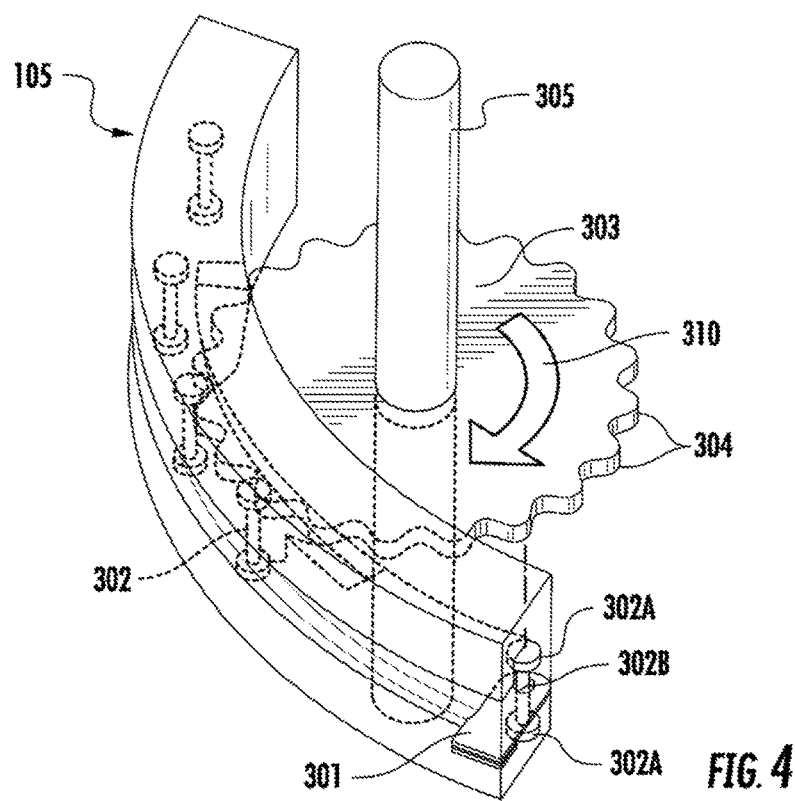

FIG. 4 illustrates a perspective view of a planting material transport device assembly that uses rollers and gears, in accordance with embodiments of the invention.

Figure 5:
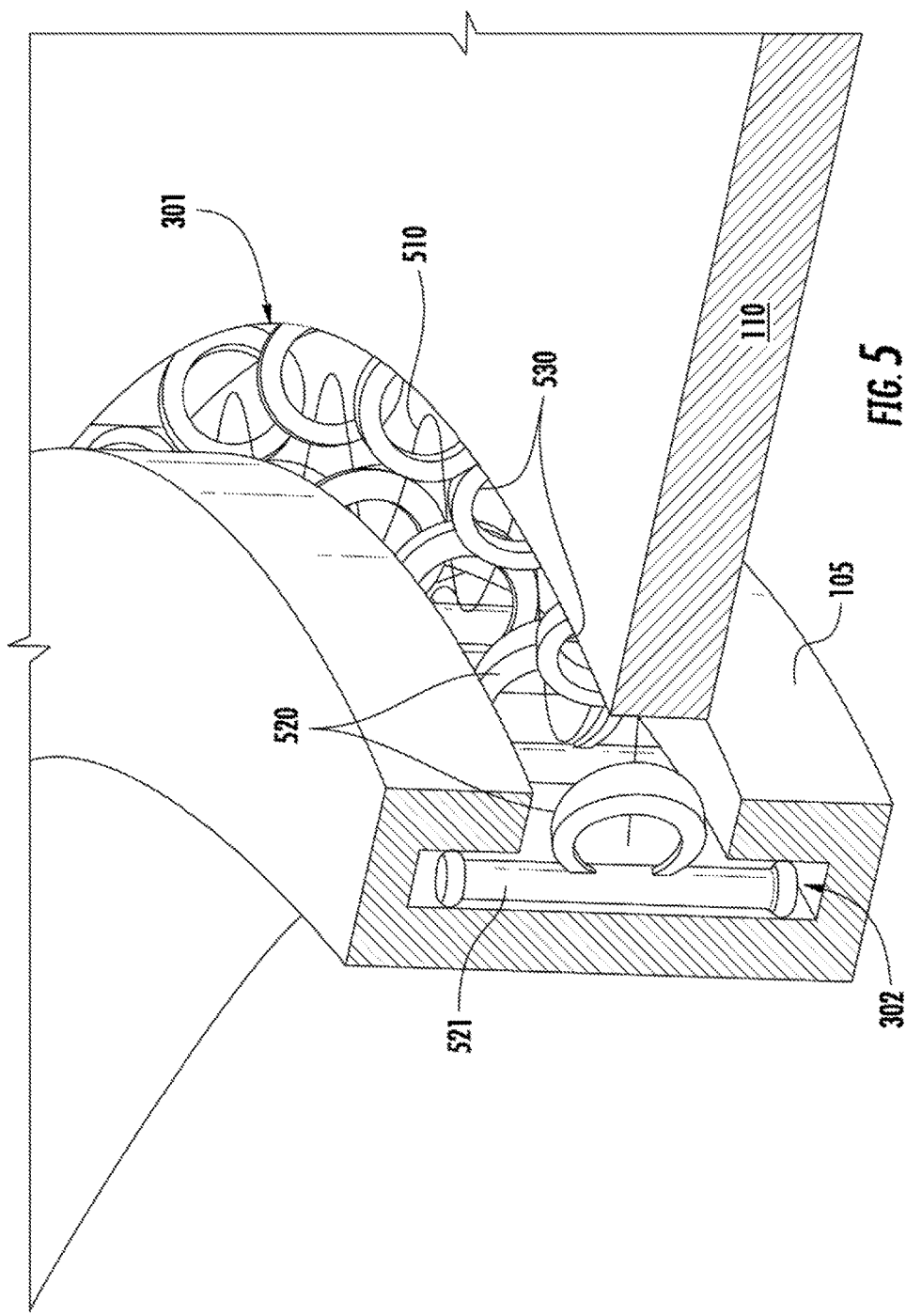

FIG. 5 illustrates a perspective view of a planting material transport device assembly that uses cables, in accordance with embodiments of the invention.

Figure 6:
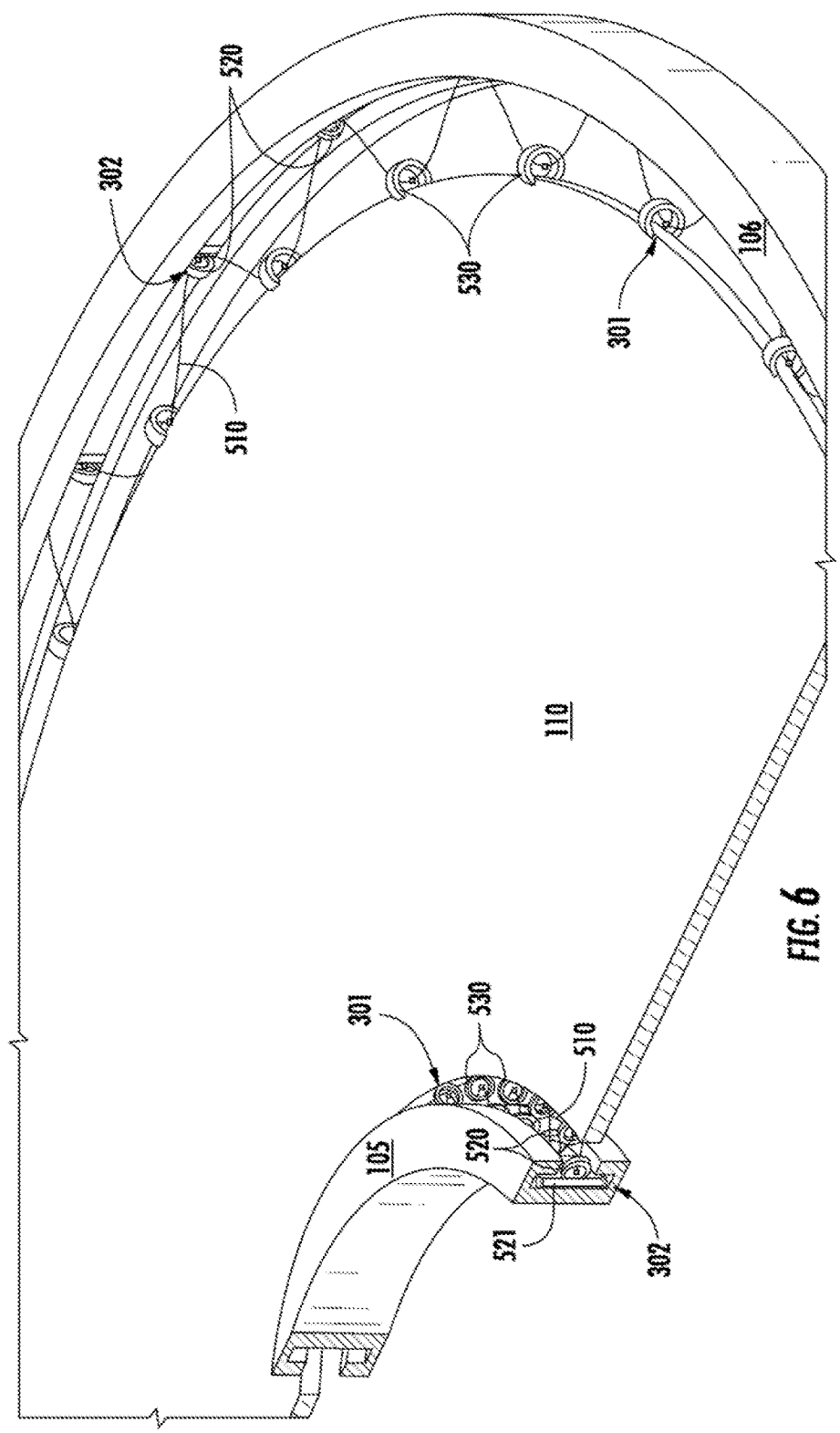

FIG. 6 illustrates a perspective view of a planting material transport device assembly that uses cables, in accordance with embodiments of the invention.

Figure 7:
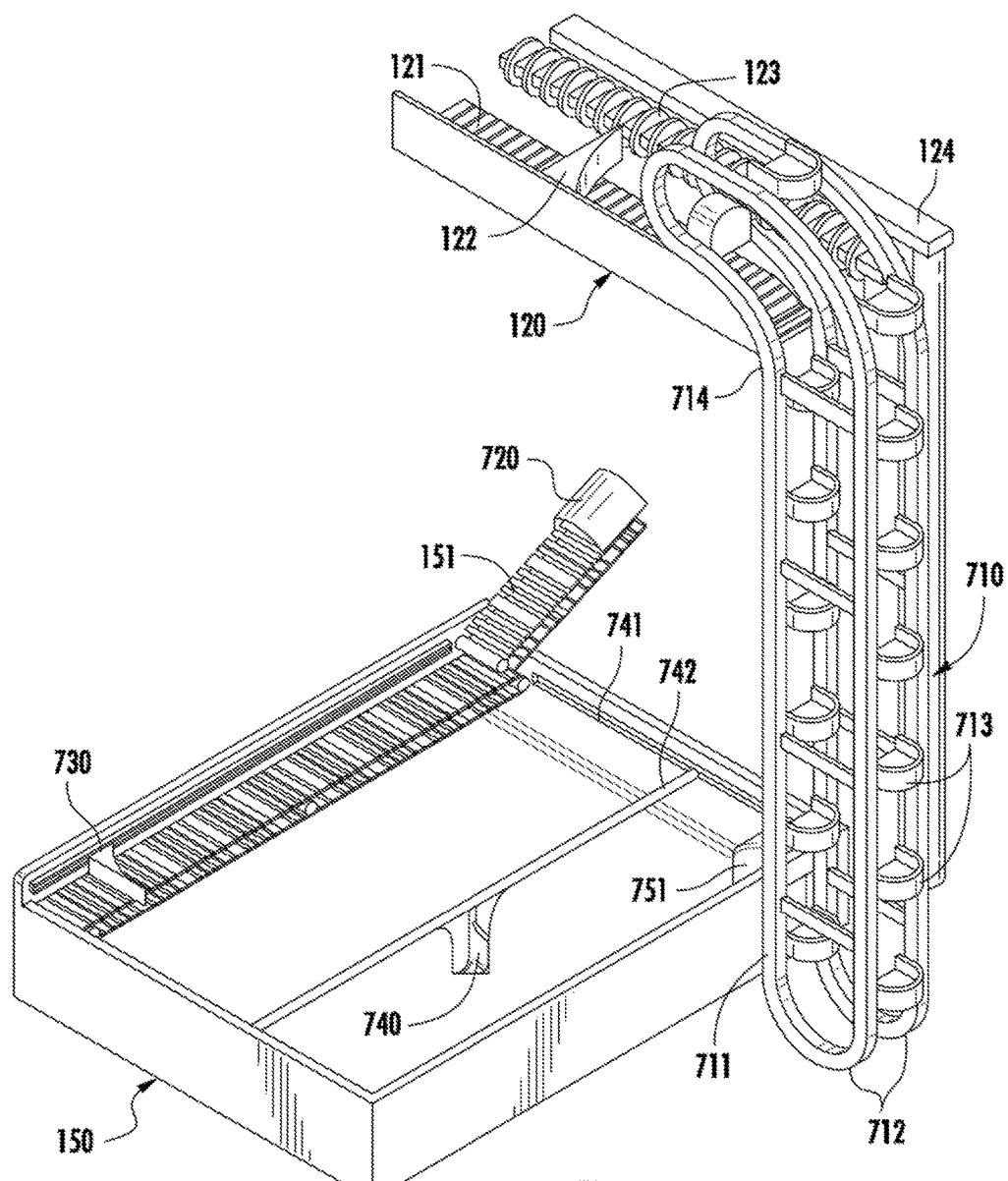

FIG. 7 illustrates a perspective view of a compost housing, compost transport assembly, and a depositor, in accordance with embodiments of the invention.

Figure 8:
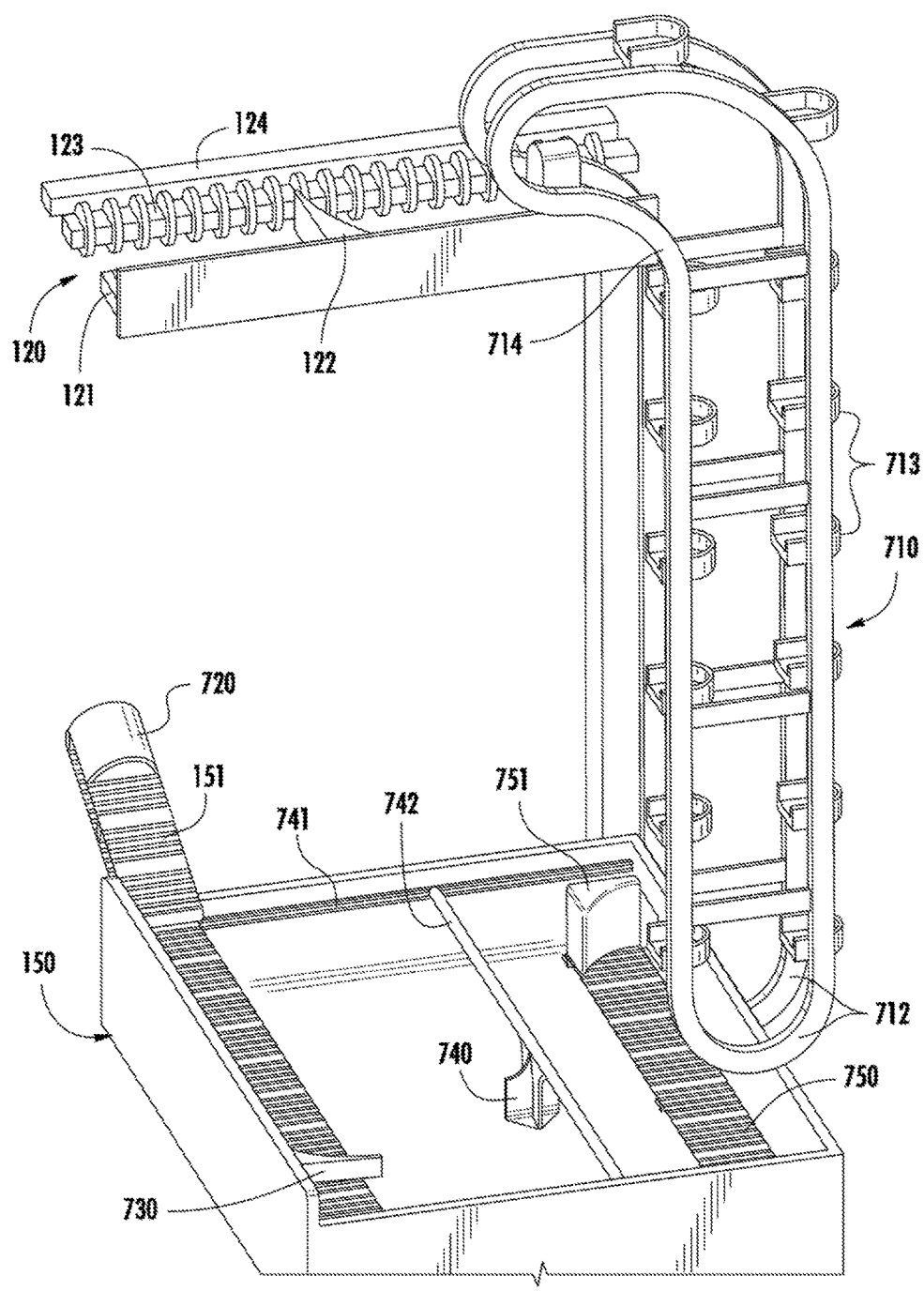

FIG. 8 illustrates a perspective view of a compost housing, compost transport assembly, and a depositor, in accordance with embodiments of the invention.

Figure 9:
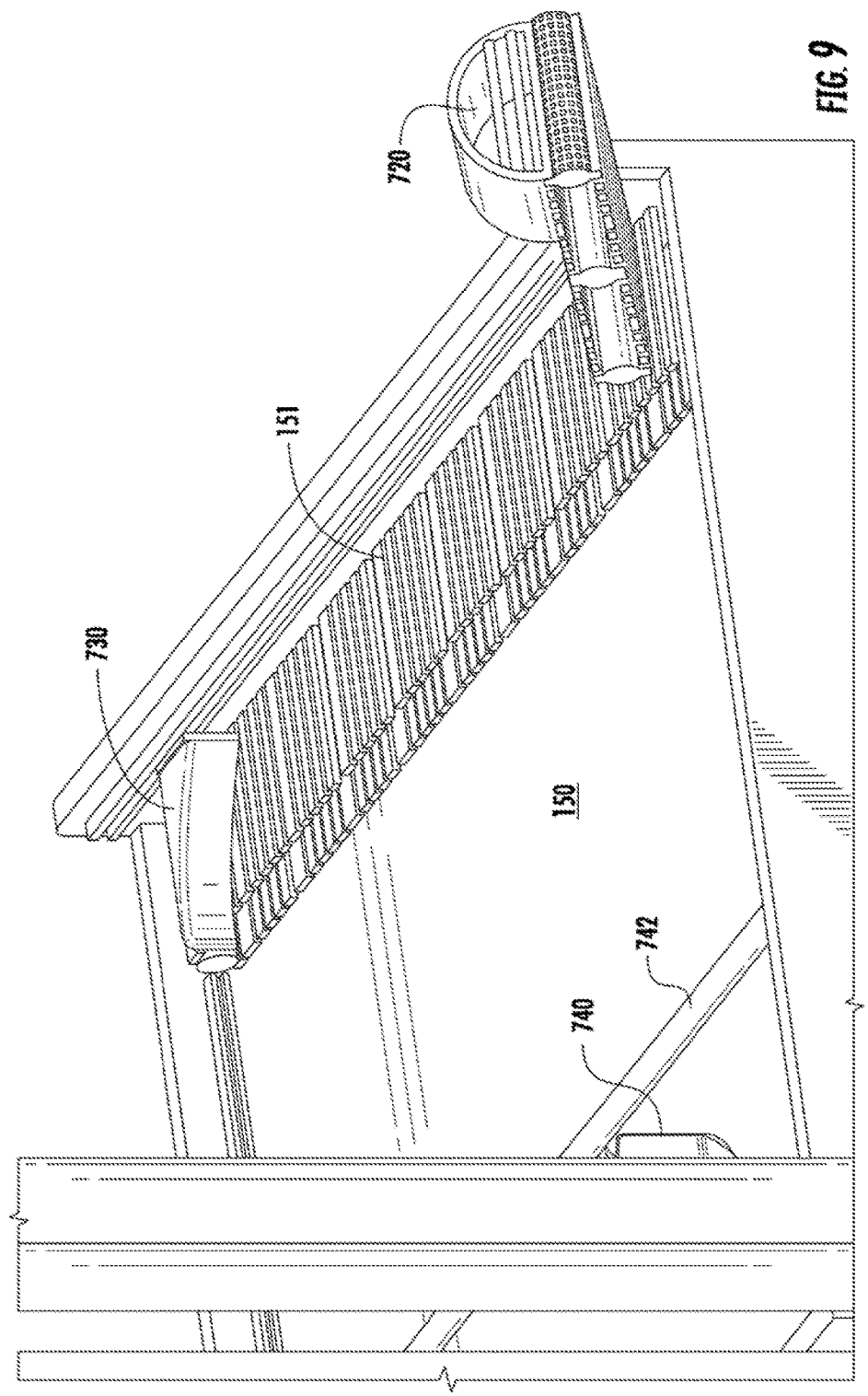

FIG. 9 illustrates a perspective view of a compost housing, in accordance with embodiments of the invention.

Figure 10:
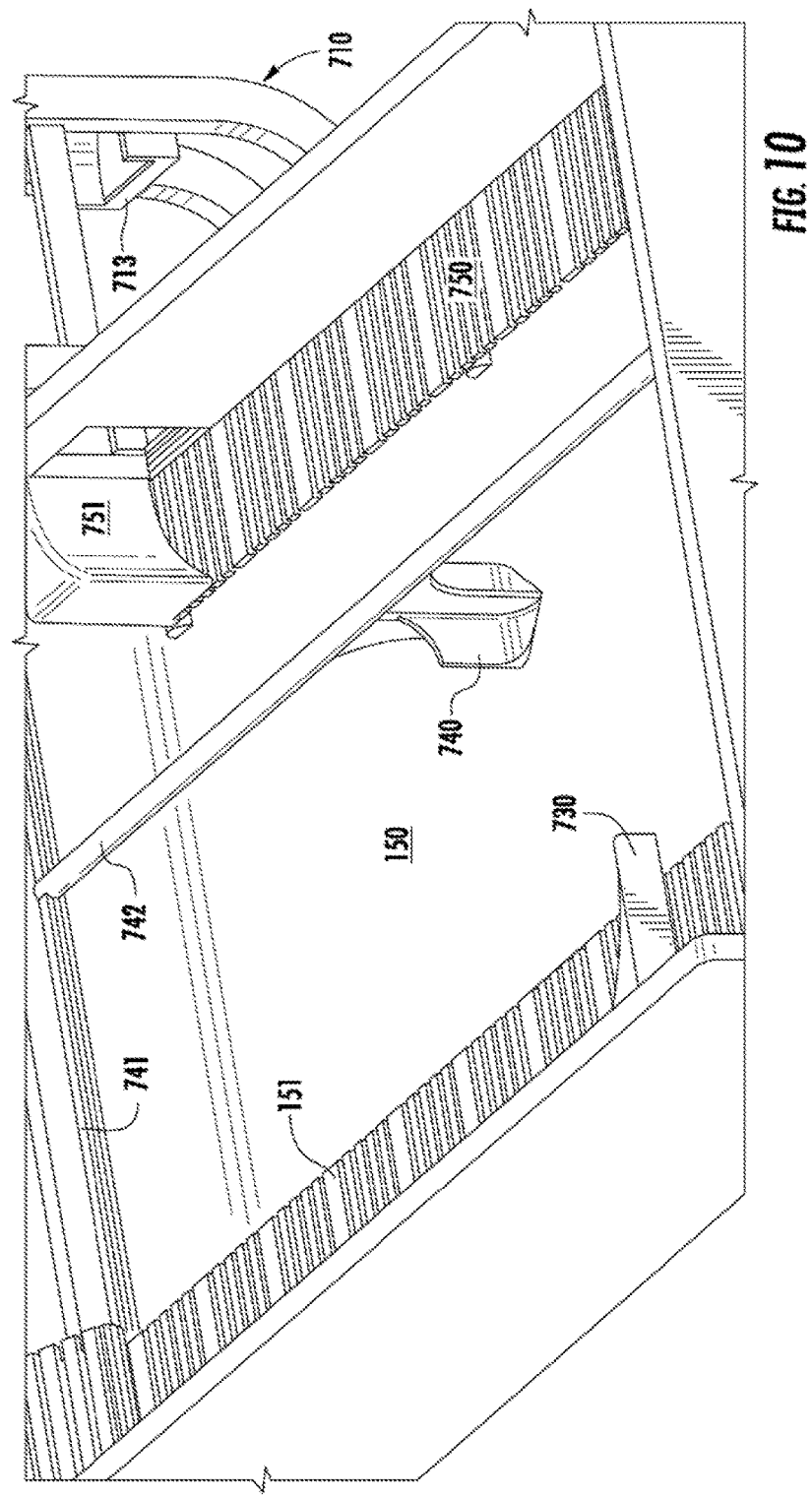

FIG. 10 illustrates a perspective view of a compost housing and a compost transport system, in accordance with embodiments of the invention.

Figure 11:
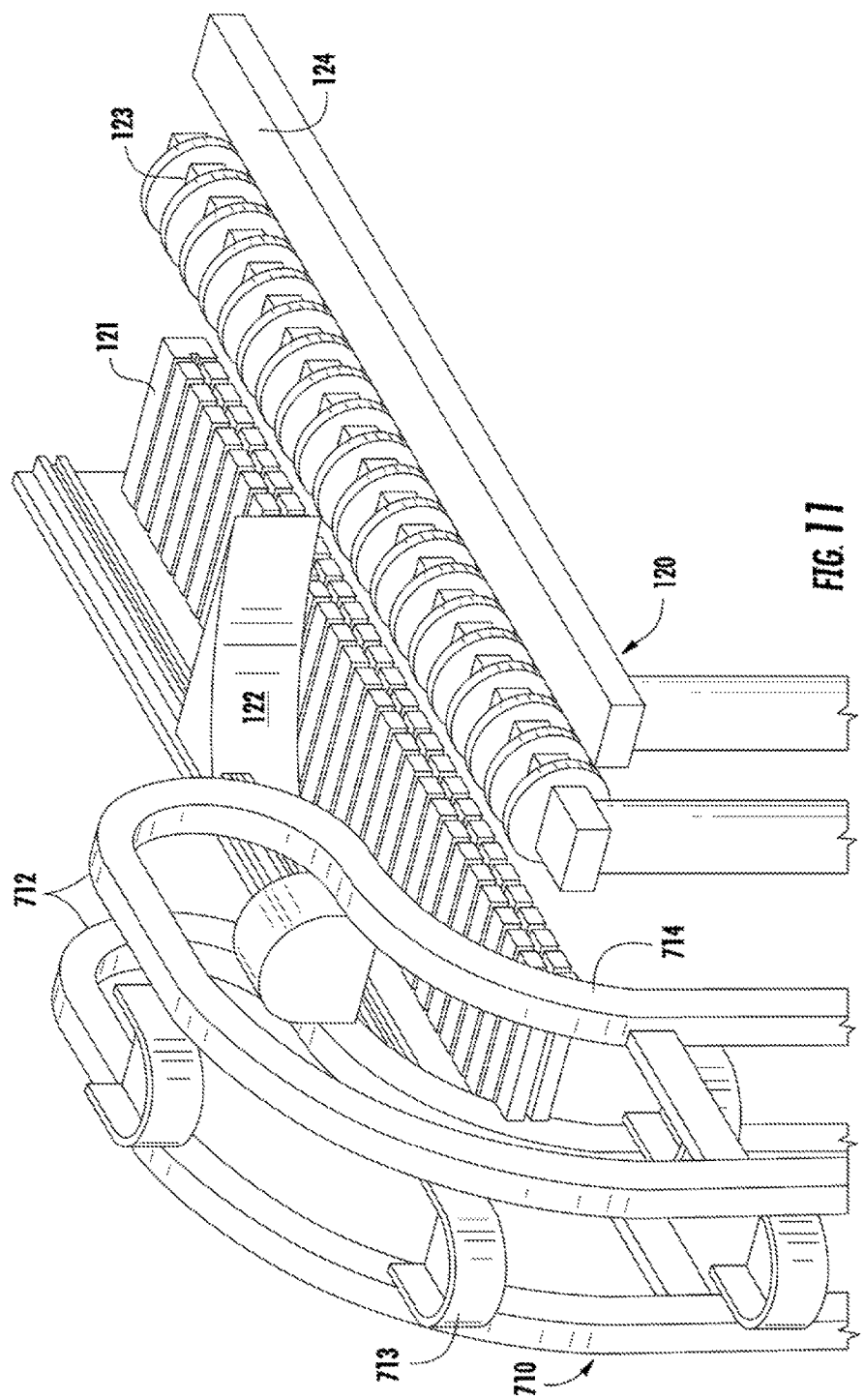

FIG. 11 illustrates a perspective view of a compost transport system and a depositor, in accordance with embodiments of the invention.

Figure 12:
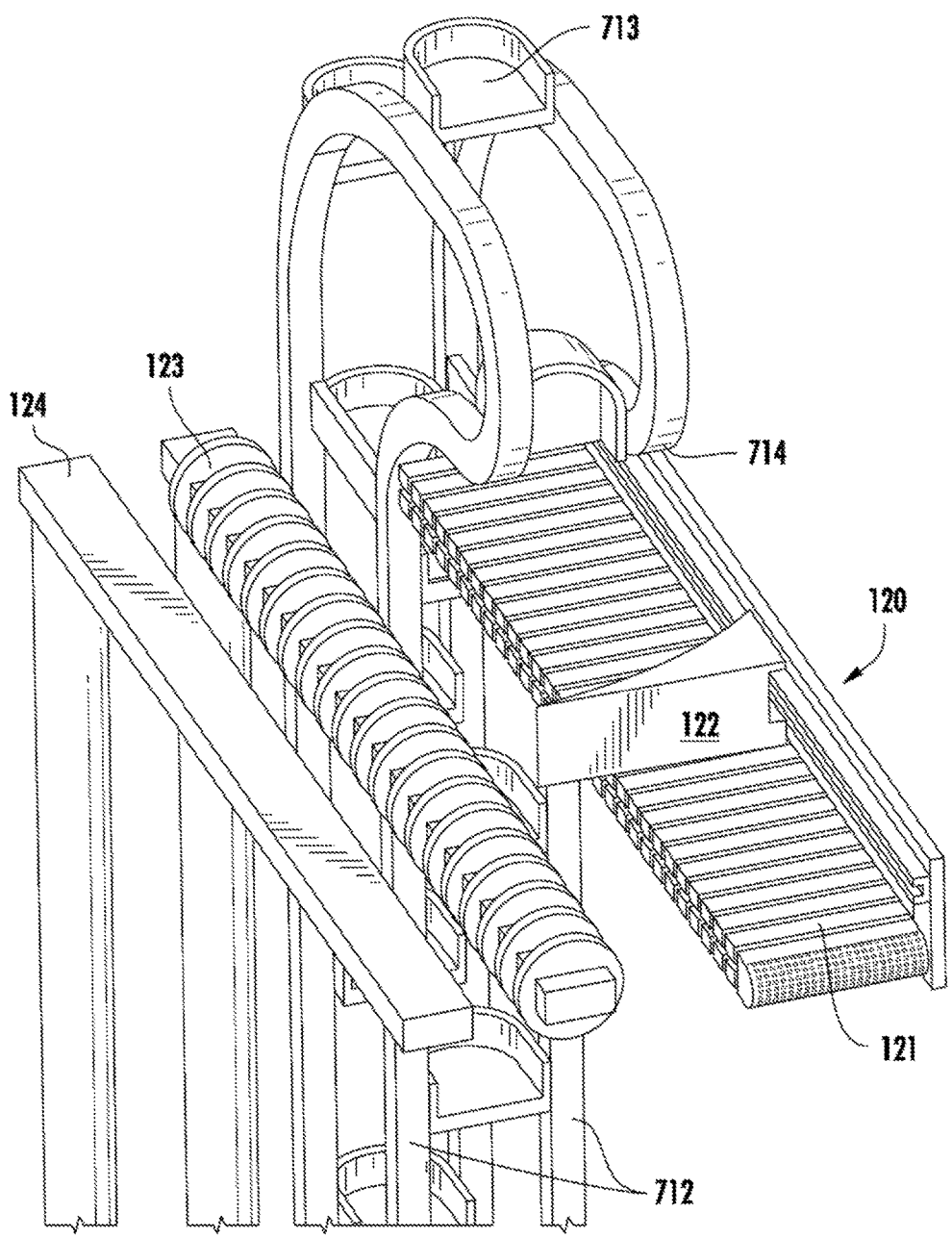

FIG. 12 illustrates a perspective view of a compost transport system and a depositor, in accordance with embodiments of the invention.

Figure 13:
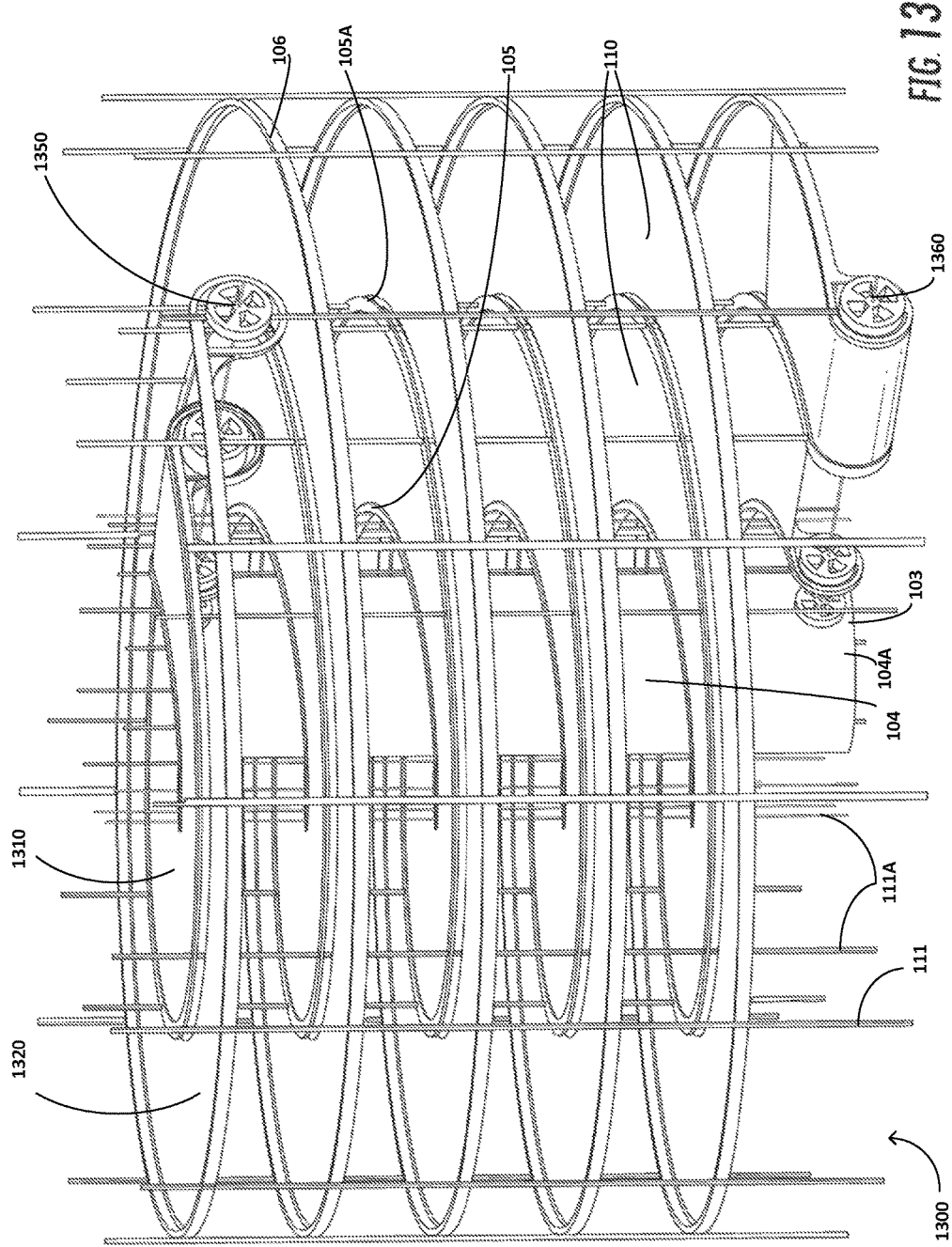

FIG. 13 illustrates a perspective view of the inner portion of a helical farming apparatus, in accordance with embodiments of the invention.

Figure 14:
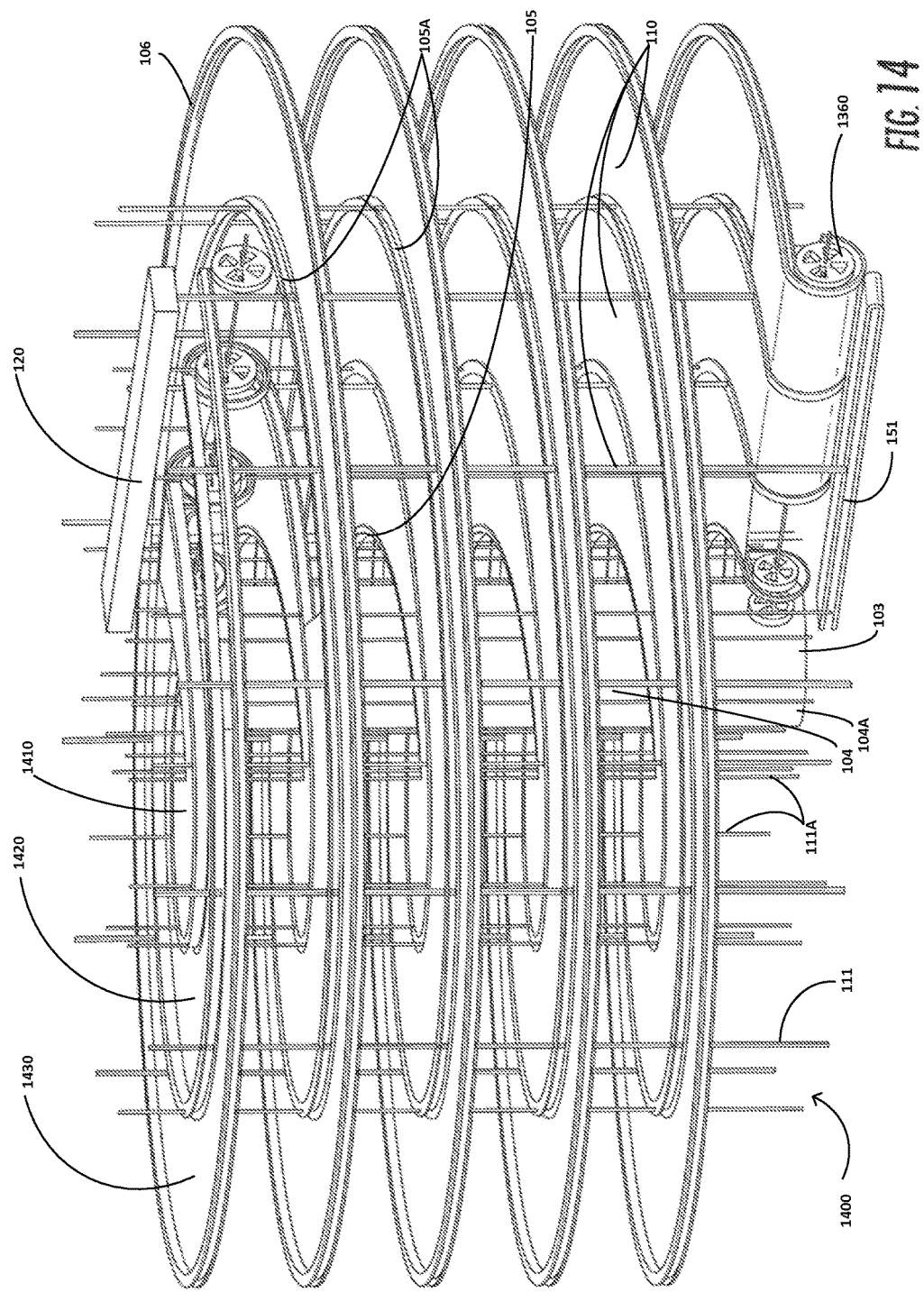

FIG. 14 illustrates a perspective view of the inner portion of a helical farming apparatus, in accordance with embodiments of the invention.

DETAILED DESCRIPTION OF EMBODIMENTS OF THE INVENTION

Embodiments of the present invention may now be described more fully hereinafter with reference to the accompanying drawings, in which some, but not all, embodiments of the invention are shown. Indeed, the invention may be embodied in many different forms and should not be construed to the embodiments set forth herein; rather, these embodiments are provided so that this disclosure may satisfy applicable legal requirements. Like numbers refer to like elements throughout.

To improve the rate of crop production over a plot of land, various embodiments of the invention may provide for an apparatus comprising planting material (e.g., a fabric, tarp, mesh, textile, cloth, or other like material) for supporting soil and crops, wherein the planting material continuously travels vertically downward (e.g., in a helical path, or another like path) from the top of the apparatus to the bottom of the apparatus (or vice versa in other applications), with soil and seeds deposited adjacent the apparatus top (e.g., near the top of the helical path of the planting material, or the like), and with a harvester located adjacent the apparatus bottom (e.g., near the end of the helical path of the planting material). A return support structure is utilized to return the planting material to the apparatus top and create a continuous loop of material on which crops may grow.

FIG. 1 illustrates a side view of a helical apparatus 100 used in agriculture according to one embodiment of the present invention. It should be noted that as used herein, the helical apparatus 100 may be simply referred to as "the apparatus" 100, which may indicate that the apparatus creates a helical path for the planting material 110 or another type of path for the planting material 110. As shown in FIG. 1, the apparatus 100 may be defined by a light receiver 101 (e.g., a cone that opens downwardly, or other like shape), a cover 102 (e.g. a disk, trough, collector, or the like), a central support member 103, a conduit 104 (e.g., a tube of any shape or size), an inner material transport assembly 105, an outer transport assembly 106, planting material 110, outer support members 111, support cables 112, anchors 113, a depositor 120, a harvester 130, a harvester conveyor 131, an apparatus base 140, a compost housing 150, and a compost conveyor 151.

The light receiver 101 may be operatively coupled to the central support member 103 and one or more support cables 112 (e.g. light receiver support cables). In some embodiments, the underside 101A of the light receiver 101 may comprise one or more solar panels positioned to receive light reflecting off of the cover 102. In other embodiments, the underside 101A of the light receiver 101A may be comprised of one or more mirrors, or other reflective material, which receives light reflected off of the cover 102 and directs the light downward, toward a location on the cover 102 or other location. In some embodiments, the location to which the light is directed may comprise one or more solar panels. In another embodiment, the location to which the light is directed may be a pool of water that is collected in at least a portion of the cover 102, whereby concentration of light toward the water may heat the water within the cover 102 and produce steam that may be captured by the apparatus 100. The steam may be utilized for heating by piping the heating throughout the apparatus 100 and/or as power generation (e.g., through turning a turbine). In one embodiment, the cover 102 itself may act as a container of water as discussed below. In some embodiments of the invention, the top side 101B of the light receiver 101 may also comprise solar panels, which may further be used for power generation.

The cover 102 may be a funnel-shaped (e.g., cone or other like shape) structure constructed of any substantially rigid material. The outer rim 102A of the cover 102 may be operatively coupled to, and supported by, each of the outer support members 111. The cover base 102B of the cover 102 may be operatively coupled to the conduit 104 and/or the central support member 103. For example, the cover base 102B of the cover may be secured to the outer wall of the conduit 104 and/or the central support member 103, connected to the top of the conduit 104 and wall of the central support member 103, or secured in another way. In one embodiment the funnel-shaped configuration, or other like shape that creates a cavity, of the cover 102 may allow for the collection of rain water. In some embodiments, the cover 102 may act as a basin and retain the rain water for later use in irrigation, or steam generation for heat or energy creation. In some embodiments, the cover 102 may direct the rain water to a device within the conduit 104 (or adjacent the conduit 104) that is designed for irrigation, heat generation, or energy creation. In some embodiments, the upper surface 102C of the cover 102 may be comprised of a reflective material. In such an embodiment, the upper surface 102C of the cover 102 may reflect sunlight upward towards the underside 101A of the light reflector 101 used to create steam or energy. In still other embodiments at least a portion of the cover 102 may comprise solar paint, solar panels, or other like solar material that can be utilized to covert light into energy in order to power at least a portion of the apparatus 100.

The central support member 103 may be a rod, pole, or supportive structure of any shape, which supports the light receiver 101 in the light receiver's 101 elevated position above the cover 102. In other embodiments the central support member 103 may also provide support to other parts of the apparatus, such as but not limited to the conduit 104, inner material transport assembly 105, outer material transport assembly 106, outer support members 111, or the like. For example, in some embodiments of the invention, the central support member 103 may be operatively coupled at one end to the top of the conduit 104. In another embodiment, at least part of the central support member 103 is located within or outside of at least a portion of, or through the entirety, of the conduit 104, and wherein the bottom of the central support member 103 may be operatively coupled to the apparatus base 140 of the apparatus 100. In some embodiments, the top of the central support member 103 is operatively coupled to the center or the top of the light receiver 101. The central support member 103 provides structural support for the light receiver 101 in order to hold light receiver 101 in its central, elevated location, relative to the rest of the apparatus 100. In some embodiments of the invention (not shown), the support cables 112 are operatively coupled to the central support member 103, instead of the light receiver 101. In some embodiments the central support member 103 and the conduit 104 are the integral and the same support member. In other embodiments there is not conduit 104 and the central support member 103 replaces the conduit 104.

The conduit 104 may be a cylinder, tube, or other open or closed structure of any shape. The conduit 104 may house several components (not shown) of the apparatus 100, including a compost transport system 710 (e.g. auger, bucket system, or other soil or compost lifter), a human access system (e.g. an elevator for humans and materials, a ladder, stairs, or the like), an irrigation system (e.g., for delivering water throughout the planting material locations), and a power system (e.g., for heating, cooling, and/or lighting systems). The conduit 104 may be centrally located within the apparatus 100, with the outer wall of the conduit 104 providing support to one or more of the following features: the inner material transport assembly 105, the planting material 110, the depositor 120, the harvester 130, and the compost conveyor 151.

The compost transport system 710 may be comprised of an auger, a bucket system, a lift, or any other soil transporting mechanism which delivers soil from the compost housing 150 up to the depositor 120. In some embodiments the compost transport system 710 may automatically deliver soil (e.g., compost) from the compost housing 150 to the depositor 120. However, in other embodiments of the invention the compost transport system 710 may only provide a means to deliver soil to the apparatus top (e.g., adjacent the start of the planting material helical path), such that a human may be responsible for spreading the soil around the planting material to plant additional crops.

The human access system may be comprised of an elevator, a lift, stairs, a ladder, or any other human transport mechanism that allows one or more humans to travel from the apparatus bottom (e.g., the conduit bottom 104A) to the apparatus top (e.g., the conduit top 104B), with possible stops at different points along the vertical path of the conduit 104, such that a human may check the crops as the grow at different stages along the length of the path of the planting material 110. The human access system may allow humans to travel up the conduit 104 for farming, monitoring, and maintenance tasks of the various components of the apparatus 100 at different locations.

The inner material transport assembly 105, in one embodiment may comprise any type of railing that can be operatively coupled to the conduit 104, following a helical path around, and down, the conduit 104. In some embodiments, the inner material transport assembly 105 may be a single railing that follows a helical path down the conduit 104. In some embodiments, the inner material transport assembly 105 comprises a "C-beam" or two rails one on top of the other. Material couplings 301 (e.g., clips, hooks, o-rings, or the like) and coupling movement devices 302 (e.g., rollers, bearings, cylinders, or the like) may be operatively coupled to the inner material transport assembly 105. The planting material 110 may comprise an inner edge (e.g., first edge, or the like), an outer edge (e.g., second edge, or the like), and a body extending between the inner edge and the outer edge. The inner edge of the planting material 110 may be operatively coupled to the inner material transport assembly 105, while the outer edge may be operatively coupled to the outer material transport assembly 106 (discussed in further detail below), such that the location and orientation of the inner material transport assembly 105 and outer material transport assembly 105 determines the location and orientation of the planting material 110. In some embodiments, the helical path of the inner material transport assembly 105 may have a constant pitch throughout (the width of each helical turn is constant). In some embodiments, the helical path of the inner material transport assembly 105 may increase in pitch as the helical structure moves downward (the width of each helical is constantly increased down the path of the inner rail 105). As will be discussed later, this increase in pitch, moving down the helical path, may allow the proper amount of space for a plant to grow from a seed to its mature height without wasting space in the apparatus 100 between helical rotations.

Like the inner material transport assembly 105, in some embodiments, the outer material transport assembly 106 comprises a single rail, multiple rails, a "C-beam" railing, or other like rail, and material couplings 301 and coupling movement devices 302 that may be operatively coupled to the outer railing 106. Moreover, the outer material transport assembly 106 may be operatively coupled to the planting material 110, so its location and orientation determines the location and orientation of the planting material 110. The outer material transport assembly 106 may be positioned equidistant from the inner material transport assembly 105, such that the outer material transport assembly 106 follows the same helical path around the conduit 104 as the inner material transport assembly 105. However, the outer material transport assembly 106 has a greater length than the inner material transport assembly 106. The helical path of the outer material transport assembly 106 may generally follow the same pitch as the inner material transport assembly 105 so that the inner material transport assembly 105 and outer material transport assembly 106 run substantially parallel to each other at all points down the helical path. This parallel orientation of the inner and outer material transport assemblies 105, 106, allows a planting material 110 to be positioned substantially horizontal between the inner and outer material transport assemblies 105, 106, at all points down the helical path. In other embodiments of the invention the inner and outer material transport assemblies 105, 106 may be positioned to create an angle for the planting material 110 in order to create or prevent run-off or pooling of water from the irrigation system in different locations in the apparatus 100. It should be understood that the rails described above may be any type of rod, bar, track, or other like device that allows a coupling to move with respect to the rail as described in further detail below.

Referring to FIG. 2, one embodiment of the invention includes one or more return support assemblies 201, for example, two return rails that are operatively coupled to both the inner material transport assembly 105 and the outer material transport assembly 106, and connect the bottom locations of the inner material transport assembly 105 and the outer material transport assembly 106 to the top locations parts of the inner material transport assembly 105 and the outer material transport assembly 106. In the embodiment illustrated in FIG. 2, the return support assemblies 201 travel outward horizontally (e.g., transverse from the helical orientation), underneath the last helical path of the apparatus 100, vertically outside of the helical path of the outer material transport assembly 106, and return horizontally to the beginning of the helical paths of the inner and outer material transport assemblies 105, 106. The illustrated configuration creates a continuous pathway of support assemblies 105, 106, 201, that a planting material 110 and any associated components (e.g., material couplings 301, coupling movement devices 302, or the like) may continuously travel along. In one embodiment, only one return rail is used to return the planting material 110 back to the top of the helical path. For example, the outer and inner rails converge together to transport the planting material 110 back to the apparatus top where the outer and inner rails diverge to create the helical path.

In one embodiment, as the planting material 110 transitions from the helical path (or other shaped path) the return support at least the outer edge of the planting material, and in some embodiments the inner edge, is configured for fold upon itself or bunch up in order to take into account that the outer edge of the planting mater is longer than the inner edge as the planting material 110 returns to the top of the apparatus 100. Alternatively when the planting material 110 returns to the helical path (or other like path) the planting material unfolds or unbunches in order to become tight in order to receive and support soil for additional planting.

In other embodiments of the invention, the outer edge and the inner edge of the planting material 110 may be the same or similar lengths and planting material folds on top of itself adjacent the inner material transport assembly 105 when following the helical path, while it is stretched out when the path reaches the return support assemblies 201.

In still other embodiments of the invention, the planting material 110 is stretchable enough, such that it is tight as it follows the helical path (or other like path) and the outer edge of the planting material contracts and/or the inner edge expands when the planting material transitions from the helical path to the return path (and vice versa).

In still other embodiments of the invention the inner material transport assembly 105 and the outer material transport assembly 106 may comprise one or more cables (e.g., rope, nylon, composite, steel, or the like) and a plurality of members (e.g., hook member, eyelet member, clip member, or the like) that operatively couples the outer edge of the planting material 110 to an outer rail (e.g., rod, bar, track, or the like) and an inner edge of the planting material 110 to an inner rail (e.g., rod, bar, track, or the like), as illustrated in FIG. 5 and as discussed in further detail later. In some embodiments of the invention the one or more cables may be able to be tightened or loosened in order to control how tight the planting material 110 is between the inner material transport assembly 105 and the outer material transport assembly 106.

Regardless of how the planting material is attached to the inner material transport assembly 105 and the outer material transport assembly 106, the planting material 110 may be any sort of material that supports and/or aids in the planting and growth of any type of crop. As previously discussed some examples of the planting material 110 include, but are not limited to, fabric, tarp, mesh, textile, cloth, and other like materials. As previously discussed the planting material 110 is positioned between the inner material transport assembly 105 and the outer material transport assembly 106 of the apparatus 100, such that the planting material 110 occupies at least a portion of the plane between the inner and outer material transport assemblies 105, 106. The general functional nature of the planting material 110 is to support soil and crops, travel down the helical path (or other shaped path) defined by the inner and outer material transport assembly 105, 106, and recycle the soil and discarded portion of the crops as compost to be recycled for reuse as soil. Therefore, the planting material 110 must be strong enough to support soil and plants, as well as any water within the soil. In some embodiments, the planting material 110 is impermeable to fluid, and water cannot pass through the planting material 110. In other embodiments, the planting material 110 is permeable to water, allowing water to pass through at least one layer of the planting material 110 and subsequently drop down to the layers of soil, plants, and planting material 110 below. In some embodiments, the planting material 110 is stretchable and/or flexible, such that the planting material 110 may be deformed from its normal, helical orientation to follow the return support assemblies 201 back to the top of the helical path. In other embodiments of the invention the planting material 110 is ridged or semi-ridges such that it is not deformed or minimally deformable and it is folded or bunched up in order to return the planning material 110 to the top of the helical path (or other shaped path). The planting material 110 may be re-usable, in that the material is undamaged or not substantially damaged by the soil, plants, water, harvesting, or the like, that may interact with the planting material 110 during its helical path down the apparatus 100, or by any stretching of the planting material 110. It should be understood that in some embodiments crops may grow on the planting material without the need for soil, or through the use of another type of compound that can replace the use of soil.

In some embodiments, the planting material 110 is operatively coupled to the inner material transport assembly 105 and outer material transport assembly 106, such that the planting material 110 may move along the helical path (or other path) defined by the inner and outer assemblies 105, 106. For example, in some embodiments of the invention, the planting material 110 may be operatively coupled to material couplings 301 (e.g. clamps, hooks, eyelets, one or more cables, etc.). The material couplings 301 may be any type of coupling device capable of securing itself to a part of the planting material 110 and securing another part of itself to a coupling movement device 302 (e.g., rollers, bearings, slides, rings, hooks, eyelets, or the like). These material couplings 301 may be connected to the planting material 110 at one end, and connected at the other end to a coupling movement device 302 operatively coupled to one or more rails, or other like device. The coupling movement devices 302, along with their respective material couplings 301, may be spaced throughout the rails, or other like device, of the inner material transport assembly 105 and the outer material transport assembly 105 of the apparatus 100. The material couplings 301 hold the planting material 110 in a specific position, based on the location of the coupling movement device 302 along the inner and outer rails, or other like device. The coupling movement devices 302 may be any device that allows the material couplings 301 to travel along the inner and outer rails (e.g., rod, bar, track, etc.). In some embodiments there are more material couplings 301 and coupling movement devices 302 on the outer edge then the inner edge of the plating material. One potential embodiment of the material couplings 301 and the coupling movement devices 302 will be discussed below with reference to FIGS. 3 and 4. Another potential embodiment of the material couplings and the coupling movement devices 302 will be discussed below with reference to FIG. 5.

The outer support members 111 may be operatively coupled to, and support, the outer material transport assembly 106 (e.g., rails as described above, or the like) of the apparatus 100, at one or more levels of the helical path (or all levels). The bottom of the outer support members 111 may be secured to the base 140 of the apparatus 100 and/or directly into the surrounding ground (e.g., footings, or the like), and the top of the outer support members 111 may be operatively coupled to, and provide structural support for, the cover 102. In one embodiment, the bottom of the outer support members 111 may be secured into the ground. Some of the outer support members 111 may additionally be operatively coupled to, and provide structural support for, other components of the apparatus 100, such as the depositor 120, the harvester 130, the harvester conveyor 131, and the return support assemblies 201.

In some embodiments, apparatus support cables 112 may provide additional support to the apparatus 100. The apparatus support cables 112 may be operatively coupled to anchors 113, which are in turn secured to either the ground or the base 140 of the apparatus 100. The ends of the apparatus support cables 112 may be operatively coupled to a middle section (as illustrated), a lower section, and/or an upper section of the outer support members 111. Moreover, the apparatus support cables 112 may be operatively coupled to the light receiver 101, the cover 102, and/or the central support member 103. In some embodiments, the apparatus support cables 112 may be operatively coupled to the top of the outer support members 111 and/or the cover 102, or any other combination of components in the apparatus 100. In some embodiments, connectors 112A may be used to operatively couple the apparatus support cables 112 with the outer support members 111, the cover 102, and/or the light receiver 101. In some embodiments of the invention, the apparatus support cable 112 is comprised of a rope, steel, wire, tether, nylon, composite material, or any other cable-type material capable of securing the apparatus 100. In one embodiment of the invention, a single apparatus support cable 112 is attached at one end to the middle of the outer support member 111, runs outward from the apparatus 100 and is operatively coupled to an anchor 113, then runs back toward the top of the apparatus 100 to be operatively coupled with the top of the outer support member 111, the cover 102, and/or the light receiver 101. In some embodiments, more than one apparatus support cable 112 is operatively coupled at one end to an anchor 113. In such an embodiment, the other ends of each apparatus support cable 112 is operatively coupled to the respective outer support member 111 (the top, middle, or bottom), the cover 102, and/or the light receiver 101.

The base 140 of the apparatus 100 may be comprised of any material that allows for structural support of the apparatus 100. In some embodiments, the base 140 is simply the ground upon which the apparatus 100 rests. In other embodiments, the base 140 is a solid platform formed with concrete, steel (e.g., beams and/or rebar), composite material, and the like, that supports the apparatus 100. In some embodiments, the base 140 may provide protection from natural elements such as flooding, animal infestations, and the like. The base 140 may provide a securing connection for the conduit 104, the inner support member 103, the outer support members 111, and/or the anchors 113. In some embodiments, the base 140 may provide structural support and/or protection for the compost housing 150, the compost conveyor 151, and the compost transport system.

The depositor 120 may be any mechanism capable of depositing soil, seeds, water, fertilizer, and/or any other material used in planting or growing crops onto the planting material 110. In one embodiment, a single depositor 120 may deposit the soil, seeds, water, fertilizer, etc. In another embodiment, more than one depositor 120 may be used. In one embodiment, the depositor 120 deposits at least the soil and one or more users may finish the planting process. In other embodiments users may be responsible for depositing the soil, seeds, water, and/or fertilizer. The following example embodiments refer to the depositor 120 depositing soil, but it should be noted that these embodiments also envision depositing the seeds, fertilizer, water, and any other material used in planting or growing crops. In one embodiment, the depositor 120 is located on top of, or above, the planting material 110, at the top of the planting material's 110 helical path (or other like path). The depositor 120 may be operatively coupled at one end to the conduit 104, and at the other end to one of the outer support members 111. In one embodiment, the depositor 120 receives soil from the compost transport system, via the conduit 104. For example, the compost transport system may deliver soil up the conduit 104, from the compost housing 150, and once the soil reaches the top of the conduit 104, where the depositor 120 is located, the soil is transported away from the conduit 104 and outward along the depositor 120, before the depositor 120 delivers the soil onto the planting material 110 passing beneath. While the planting material 110 is moving along its helical path at a uniform rotational speed, the linear speed of the planting material 110 is faster at points closer to the outer material transport assembly 106 than at points near the inner transport assembly 105. Because of this discrepancy in the speed of the planting material 110 passing underneath the depositor 120, the depositor 120 may deposit more soil, or deposit soil more quickly, at points further away from the conduit 104 so that the planting material 110 may have a substantially uniform soil thickness across its entire surface area. This same concept may be used for the planting of seeds to keep the seeds (and crops) a substantially uniform distance from the other seeds.

The seeds deposited by the depositor 120 may be stored within the depositor 120, within the conduit 104, in the compost housing 150, or in an external housing such as a silo. In embodiments where the seeds are stored within the conduit 104 or the compost housing 150, the seeds may be transported up the conduit 104, and to the depositor 120, via a seed transport system, which may be the same transport system as the compost transport system or a different system. Seeds stored in an external housing may be transported through the conduit 104, and out along the depositor 120, moving away from the conduit 104. In another embodiment, the seeds may be transported into the apparatus 100 from the external housing, being delivered to the end of the depositor 120 located near the outer material transport assembly 106. In other embodiments the seeds may be planted by hand by one or more users.

In some embodiments, the depositor 120 is removable and replaceable. For example, one depositor 120 may be used to plant lettuce. When a user has planted enough lettuce, the user may remove the lettuce depositor 120 and replace it with a corn depositor 120, designed to plant corn. In some embodiments, the depositor 120 may be capable of planting more than one type of crop and does not need to be replaced. In some embodiments with multiple depositors 120, a first depositor 120 is located at the top of the helical path of the planting material 110, while a second depositor 120 is located at a position further down the helical path of the planting material 110. The first depositor 120 may deposit soil and seeds, then after the planting material 110 has travelled along the helical path for a desired amount of time, the second depositor 120 may deposit fertilizer onto the soil and seed mixture. This embodiment is especially useful when the seeds of a specific crop need to be fertilized at some point after the seeds are planted.

The harvester 130 may be any mechanism capable of harvesting crops from the planting material 110 as the planting material 110 travels underneath, or through, the harvester 130. The harvester 130 may be operatively coupled at one end to the conduit 104 (or the inner material transport assembly 105) and extend at least as far as the outer material transport assembly 106. In some embodiments, an outer support member 111 is operatively coupled to the harvester 130 and may provide structural support to the harvester 130. The harvester 130 is generally located at the bottom of the helical path of the planting material 110, though in some embodiments, the harvester 130 is moveable and may be placed at a different locations along the helical path of the planting material 110. The harvester 130 may be one mechanism or multiple mechanisms that accomplish the task of removing crops from the soil, depositing the soil into the compost housing 150, and transferring the harvested crops to the harvester conveyor 131. The harvester 130 may be removable and replaceable. For example, a first harvester 130 may be used to harvest cabbage, but when the crop changes to corn, the first harvester 130 may be replaced with a second harvester 130 designed to harvest corn. In some embodiments, a single harvester 130 may be versatile enough to harvest more than one type of crop and does not need to be replaced. In some embodiments, no harvester 130 is used, and one or more human users may do the harvesting of the crops instead. In some embodiments, the harvester 130 actively removes the soil from the planting material 110 and delivers the used soil to the compost housing 150. In some embodiments, the harvester 130 does not actively remove the soil from the planting material 110, and the soil is deposited into the compost housing 150 when the planting material 110 wraps underneath itself, on its way back to the top of the apparatus 100, via the return support assemblies 201.

The harvester conveyor 131 may be any type of mechanism that can transport the harvested crops away from the harvester 130, and to a new location such as a storage container, silo, truck, assembly line, user, and the like. In some embodiments, the harvester conveyor 131 is a conveyor belt, rollers, bins, or other like device. The harvester conveyor 131 may be operatively coupled at one end to the harvester 130.

The compost housing 150 may be a pit, container, or any other housing facility for receiving and retaining used soil from the apparatus 100. The compost housing 150 may be located at the bottom of the apparatus 100, and may either be located on top of, or within the base 140 of the apparatus 100. As depicted in FIGS. 1 and 2, the compost housing 150 may be located within in a corner of the base 140, underneath the harvester 130 and at the point where the planting material 110 wraps underneath itself, along the return support assembly 201. This positioning may allow the harvester 130 and/or the planting material 110 to easily deposit the used soil into the compost housing 150 by discarding the used soil directly below. The compost housing 150 may allow for the used soil, and any remnants of the crop, to decompose, become replenished with minerals, and become usable soil for planting again. In some embodiments, one or more mixers are located within the compost housing 150 to mix the soil and decomposing plant parts.

Since the continuous nature of this apparatus 100 may be an important aspect of the invention, the compost housing 150 serves a role of decomposing the old soil with its plant parts, and converting this used soil into fertile, rejuvenated soil that can be reused at the apparatus top at or near the start of the helical path (or other like path).

In some embodiments, a compost conveyor 151 may be operatively coupled to the harvester 130 and the compost housing 150, and configured to deliver the soil and remaining plant parts left over from the harvester 130 to the compost housing 150. In some embodiments, a compost mulcher may be operatively coupled to the compost conveyor 151 such that the compost is mulched or otherwise broken down before it reaches the compost housing 150.

In some embodiments, a compost housing conveyor 151 may be used to deliver the rejuvenated soil to the compost transport system. In some embodiments, the compost housing conveyor 151 may be one or more conveyor belts that transports compost to the compost transport system 710 located within the conduit 104. It should be understood that any transportation mechanism may be used as the compost conveyor or the compost housing conveyor, such as rollers, bins, or the like). In some embodiments, no compost housing conveyor is used, and the compost transport system receives the compost soil directly from the compost housing 150.

The compost transport system 710 may be any carrier mechanism (e.g. an auger, a series of buckets, bins, a conveyor belt, etc.) that is capable of transporting the compost soil up through the conduit 104 and deliver the compost soil to the depositor 120 or other dispensing means. In some embodiments, the compost transport system may deliver the compost soil directly onto the planting material 110, bypassing the depositor 120, which may only deposit seeds and/or fertilizer. In some embodiments, the compost transport system 710 receives the compost soil from the compost housing conveyor 151. In other embodiments, the compost transport system 710 may receive the compost soil directly from the compost housing 150. The compost housing 150, compost conveyor 151, and composite transport system 710 will be described in further detail later with respect to FIGS. 7-12.

In some embodiments of the invention, an irrigation system is provided throughout the apparatus 100. The irrigation system may be any system that provides a controlled distribution of water to the crops located throughout, or at specific locations above, the planting material 110. In one embodiment, the irrigation system is a network of pipes and sprinklers positioned above the planting material 110 in the helical path of the planting material 110. In another embodiment, the irrigation network only provides water at the top of the apparatus 100, and the planting material 110 is comprised of permeable material that allows the water not used by the crops at each level to permeate downward to the layers of crops below. In still other embodiments of the invention irrigation channels may be utilized to deliver water to the desired areas of the crops. Any form of irrigation may be used, including sprinklers, drip/localized irrigation, surface irrigation, and sub-surface irrigation. In some embodiments of the invention, at least some of the water used in the irrigation system is drawn from the rain water collected by the cover 102. In some embodiments, at least some of the water used in the irrigation system may be drawn from an external storage tank or plumbing system. In some embodiments, the irrigation system uses the collected rain water until the irrigation system runs out of rain water, before turning to the external storage tank or plumbing system. In some embodiments, the irrigation system may comprise one or more fluid pumps to transport water around the irrigation system.

In some embodiments of the invention, a lighting system is provided throughout the apparatus 100. The lighting system may be any system of artificial lights that provide the necessary light for growing crops throughout the multiple layers of the planting material 110. The lighting system may use any type of artificial light bulbs or tubes, including but not limited to incandescent, fluorescent, tungsten, halogen, and LED light bulbs and tubes. In some embodiments, the lighting system also emits and/or radiates heat that may be beneficial to the crops. In some embodiments of the invention, the lighting system may comprise light bulbs (or tubes) positioned above the planting material 110 at multiple points, or all points, down the helical path of the planting material 110. In one embodiment of the invention, the lighting system is powered by the solar panels located under (or on top of) the light receiver 101 and/or cover 102. In some embodiments of the invention, the lighting system is powered by an external power source. Such an external power source may be a generator, external solar panels, a power grid, and the like. In some embodiments, the lighting system is used in conjunction with sunlight that enters the apparatus 100 from the side of the apparatus 100.

A heating system is provided in one embodiment of the invention. The heating system may be any system capable of providing heat to the crops and soil along the entire surface, or portions thereof, of the planting material 110. In one embodiment of the invention, the heating system incorporates steam created by the light receiver 101 and/or cover 102, directing sunlight onto the rain water collected by the cover 102, whereby the heating system captures the steam and transports it throughout the apparatus 100 to provide heat to the crops. In some embodiments, the heating system uses heat generated by a heater either located within the apparatus 100 or external to the apparatus 100. Such a heater may be powered by the solar panels under (or on top of) the light receiver 101 or cover 102, an external generator, a power grid, or the like. In some embodiments, the heating system comprises a set of air ducts or other tubing material that is capable of transporting heated air throughout the apparatus 100. In one embodiment of the invention, the set of air ducts may travel above (or below) the planting material 110, and substantially follow the same helical path of the planting material 110 throughout the apparatus 100. In some embodiments, a single heater is provided within the apparatus 100, or a single heated air vent is provided to the apparatus 100, whereby the single heating unit is capable of heating the entire apparatus 100 to an appropriate temperature for the crops. Such an embodiment likely would involve a sheath or other insulating enclosure around the apparatus 100 to trap the emitted heat within the apparatus 100.

In some embodiments of the invention a cooling system is provided. The cooling system may be any system capable of providing cool air to the crops and soil along the entire surface of the planting material 110. In one embodiment of the invention, the cooling system is powered by the solar panels under (or on top of) the light receiver 101 and/or the cover 102, an external generator, a power grid, or the like. In some embodiments, the cooling system comprises a set of air ducts or other tubing material that is capable of transporting cooled air throughout the apparatus 100. In one embodiment of the invention, the set of air ducts may travel above (or below) the planting material 110, and substantially follow the same helical path of the planting material 110 throughout the apparatus 100. In some embodiments, a single air cooler (e.g., and air conditioner or the like) is provided within the apparatus 100, or a single cooled air vent is provided to the apparatus 100, whereby the single cooling unit is capable of cooling the entire apparatus 100 to a desired temperature for the crops. Such an embodiment likely would involve a sheath or other insulating enclosure around the apparatus 100 to trap the cool air within the apparatus 100. In some embodiments, the heating system and the cooling system are part of a single heating and cooling system that helps to maintain a desired temperature for the crops within the apparatus 100.

In some embodiments, a sheath is provided to surround, insulate, and protect the crops and the apparatus 100 in general. The sheath (e.g. casing, wrapper, etc.) may be any type of material that surrounds the sides and/or the top of the apparatus 100. In some embodiments, the sheath insulates the apparatus 100 to help maintain a desired temperature within the apparatus 100 for the crops. In some embodiments, the sheath may be strong enough to protect the apparatus 100 from animals, wind, precipitation (e.g., snow, heavy rains, or the like), and other natural elements that could harm the crops. The sheath may be transparent, thus allowing sunlight to enter the apparatus 100 from the sides and provide direct sunlight to at least some of the crops.

Seed storage may be provided either within or external to the apparatus 100. The seed storage may be a silo, container, or any other seed housing member capable of holding seeds for an extended period of time without causing damage to the seeds. In one embodiment, the seed storage is located within the depositor 120. In other embodiments, the seed storage is external to the depositor 120 and therefore includes a seed transporter that delivers the seeds from the seed storage to the depositor 120. In some embodiments, this seed transporter is an automated system that delivers seeds to the depositor 120 on a continuous or as-needed basis.

A water storage tank is provided in some embodiments of the invention. The water storage tank may be any type of container that can retain water (e.g. a water tower, a tank, a well, etc.). The water storage tank may be located within the apparatus 100 (e.g. within the conduit 104, on top of the base 140, etc.), or it may be located external to the apparatus 100. In some embodiments, the rain water collected by the disk 102 may be routed to the water storage tank for storage. The water storage tank may also receive water from an external water system including a pipeline, a well, other rain catchers, etc. In embodiments where the water storage tank is located below the highest point of the planting material 110, the water storage may include a water lifting mechanism (e.g. a pump, buckets, etc.). The water lifting mechanism may be automatically or manually powered. In still other embodiments of the invention the water storage tank may be located on top of the apparatus 100.

The systems described herein as being supported over at least a portion of the planting material 110 may be supported by and/or operatively coupled to the outer material transport assembly 106, the inner material transport assembly 105, and/or system supports that may be located between the outer material transport assembly 106 and the inner material transport assembly 105. For example, there may be cross bracing, trusses, or other like system supports between the outer material transport assembly 106 and the inner material transport assembly 105 to support the planting material 110 above the system supports, and to support the various components described herein below the system supports.

FIGS. 3 and 4 illustrate one potential embodiment of the invention and describes one configuration of a material coupling 301, a coupling movement device 302 and an inner rail (e.g., an inner material transport assembly 105), along with a gear 303 and a gear axle 305. As illustrated, the inner material transport assembly 105, such as the rail, may comprise a "C-beam" formation, also known as a "C channel." The coupling movement devices 302 may be positioned within the channel of the inner rail. The same configuration may be used for the outer material transport assembly 106 as well. The coupling movement device 302 shown in FIG. 3 comprises a roller with two wheels 302A and a rod 302B, but slides and other types of coupling movement devices 302 may be alternatively used. In the illustrated embodiment of FIG. 3, each coupling movement device 302 comprises two wheels 302A, located at each end of the coupling movement device 302. The two wheels 302A are positioned within the ledges 105A and 105B of the rails, such that the wheels 302A may roll along the ledges 105A and 105B, rolling the coupling movement device 302 along the C-beam channel of the inner rail. The wheels 302A may roll independently of the rod 302A, or the entire coupling movement device 302 may roll as one piece along the inner rail. As illustrated, the material coupling 301, which is illustrated as a clip, is operatively coupled to the rod 302A of the coupling movement device 302. The other end of the material coupling 301 is operatively coupled to the planting material 110 (not pictured). Only one material coupling 301 is shown in FIG. 3, for illustrative purposes, but it should be noted that each of the coupling movement devices 302 shown may be operatively coupled with a material coupling 301 like the one shown. Therefore, as the coupling movement devices 302 move along the inner rail 105, the material couplings 301 and the entire planting material 110 (not shown) will move parallel to the movement coupling devices 302.

As further illustrated in FIGS. 3 and 4, one or more gears 303 are provided to provide the force needed to move the coupling movement devices 302 along the inner rail (or other type of inner material transport assembly 105). The same gear concept may be used along the outer rail (or other type of outer material transport assembly 106) as well so that the planting material 110 moves at a constant rotational speed along the inner and outer rails. The gear 303 shown in FIG. 3 rotates about a gear axle 305 and comprises multiple gear teeth 304. The inner material transport assembly 105, such as the C-shaped rail, may comprise an aperture 105C located at the back of the "C" of inner rail, where the teeth of the gear 304 may enter the channel of the inner rail 105. These gear teeth 304 may engage the coupling movement devices 302 (e.g., rollers, or the like). An engine (not shown), or other power source, may apply a rotational force 310 to the gear axle 305 (or to the gear 303 directly). This rotational force 310 causes the gear 305 to rotate, moving its gear teeth 304 through the inner rail aperture 105C, where the gear teeth 304 engage one or more coupling movement devices 302 (e.g., rollers, or the like), and pushes the coupling movement devices 302 (e.g., rollers, or the like) along the channel of the inner rail. When such a propulsive force is applied throughout the inner and outer rails, the planting material 110 moves along the helical path defined by the inner and outer rails. Of course, since the path of the inner and outer rails is helical, the gears 303 may need to be positioned so that they are positioned substantially parallel to the plane of the inner and outer rails. To maintain a constant rotational velocity of the planting material 110, the engine and gear 303 assembly for the outer material transport assembly 106 may need to move the respective coupling movement devices 302 at a faster linear speed than the engine and gear 303 assembly of the inner rail. In other embodiments the gear ratios may be different for the inner and outer material transport assemblies 105, 106 (e.g., rails), such that a single power source and/or drive mechanism may power all the gears at the same speed. Alternatively, multiple power sources and/or drive mechanisms may be utilized to drive one or more of the gears for the inner and/or outer material transport assemblies 105, 106.

Again, the gear assembly shown in FIGS. 3 and 4 are merely illustrative of one type of assembly, which may be a part of the inner and outer material transport assemblies 105, 106, or a separate assembly (e.g., a propulsive assembly). It should be understood that many other propulsive assemblies may be utilized to move the planting material 110 along the inner and outer material transport assemblies 105, 106.

FIGS. 5 and 6 illustrate one potential embodiment of the invention and describes one configuration of inner material transport assembly 105 and outer material transport assembly 106 in which the material coupling 301 may comprise couplings that are operatively coupled to the planting material 110 and a cable 510 that is operatively couples the couplings on the planning material 110 to the couplings in the material transport assemblies. In one example embodiment, the inner material transport assembly 105 is a rail with a C-beam configuration. The coupling movement device 302 comprises a roller 521 located within the channel of the C-beam, with a movement coupling loop 520 (e.g., a hook, eyelet, ring, or the like) extending away from the roller 521. The material coupling 301 may comprise a material coupling loop 530 that is operatively coupled to the planting material 110, and extends away from the planting material 110. In some embodiments, the movement coupling loops 520 (e.g., first cable members) and the material coupling loops 530 (e.g., second cable members) may be considered "cable members" (e.g., one type of cable support structures), which can support and be operatively coupled to a cable 510. The cable 510 may be threaded, or woven, between the coupling movement loop 520 and the material coupling loop 530. As such, the cable 510 is operatively coupled to the movement coupling loop 520 and the material coupling loop 530, and has the capability to be tightened or loosened in order to regulate how tight the planting material 110 is between the inner transport material assembly 105 and outer transport material assembly 106. The example embodiment illustrated by FIGS. 5 and 6 shows the cable 510 threaded between the movement coupling loop 520 and the material coupling loop 530. In some embodiments, a gear system similar to the one described in FIGS. 3 and 4 could provide a propulsive force on the rollers 521, sliding the entire assembly, including the planning material 110 down the inner material transport assembly 105. In another embodiment, another type of propulsion mechanism may apply a force on the cable 510, pulling the cable, and therefore the entire assembly, along the inner material transport assembly 105.

It should be understood that while a number of different configurations for the inner material transport assembly 105 and outer material transport assembly 106 have been described and shown herein, these assemblies may have any type of components or configurations that allow a planting material 110 to travel a path, such as the helical path illustrated herein, in order to allow crops to grow, be harvested, and replaced with additional crops.

FIGS. 7-12 illustrate one potential embodiment of the invention and describes one configuration of a compost housing 150, compost conveyor 151, compost transport system 710, and a depositor 120. It should be noted that some elements of the apparatus 100 are removed in FIGS. 7-12 so that the illustrated elements may be observed in better detail. For example, the conduit 104 has been removed so that the compost transport system 710, which may be positioned within the conduit 104, is visible.

FIGS. 7 and 8 illustrate one potential embodiment of the invention and describes one configuration of a compost housing 150, compost conveyor 151, compost transport system 710, and a depositor 120. The compost conveyor 151 may receive the soil and leftover plant material from a harvester 130. The term "compost" may refer to any soil and plant material, and generally infers that the plant material within the soil is decomposing. The compost conveyor 151 may be configured to transport this compost through a compost mulcher 720 and deliver the material to the compost housing 150. The compost mulcher 720 may be any mechanism capable of breaking down and/or mixing compost, including any mulcher, shredder, wood chipper, mixer, or the like. A compost conveyor diverter 730 may be operatively coupled to the compost conveyor 151 within the compost housing 150. The compost conveyor diverter 730 may divert the compost off of the compost conveyor and into the compost housing 150. In some embodiments, the compost conveyor diverter 730 may be slidable along the compost conveyor 151, and the location of the compost conveyor diverter 730 determines the point at which the compost enters the compost housing 150.

A compost cultivator 740 (e.g., cultivator, plow, mixer, tiller, rotary tiller, earth mover, etc.) may be operatively coupled to the compost housing 150 and configured to cultivate and/or mix the compost within the compost housing 150. The compost cultivator 740 may disrupt the compost, which aids the compost in the process of decomposing the plant material, homogenize the compost, and prepare the compost for supporting seeds and plant growth. The compost cultivator 740 may be operatively coupled to one or more sliding rails 741, 742 (e.g., rods, bar, track, or the like), that allow the compost cultivator 740 to move all across the compost housing 150 such that every section of compost within the compost housing 150 may be cultivated.

A compost transport diverter 751 may be operatively coupled to the compost housing 150, a compost housing conveyor 750 (not shown in FIG. 7), and/or the compost transport system 710. The compost transport diverter 751 may be any mechanism capable of diverting compost from the compost housing 150 into the compost transport system 710 (e.g., a curved wall, a slanted wall, plow, or other like compost soil mover). The compost transport diverter 751 shown in FIGS. 7 and 8 comprises a curved wall located at a corner of the compost housing 150, and configured to divert compost from the compost housing 150 into the compost transport system 710. In some embodiments, the compost transport diverter 751 may push the compost into the compost transport system 710. In other embodiments, the compost is pushed toward the compost transport diverter 751 and the compost transport diverter 751 simply diverts the compost into the compost transport system 710. In one embodiment of the invention, the compost housing 150 is filled with compost such that as the compost conveyor diverter 730 diverts new compost from the compost conveyor 151 into the compost housing 150, the older compost is pushed toward the compost transport diverter 751, causing the compost transport diverter 751 to divert at least some compost into the compost transport system 710. In one embodiment of the invention, a compost housing conveyor 750 may be operatively coupled to the compost housing 150 such that as compost is pushed into the compost housing from the compost conveyor 151, at least some compost is pushed onto the compost housing conveyor 750, which may then transport the compost toward the compost transport diverter 751.

The compost transport system 710 may be any mechanism configured to receive compost from the compost housing 151, transport the compost up (e.g., through the conduit 104, outside of the conduit 104, or through another cavity) to a depositor 120, and deliver the compost to the depositor 120. The base 711 of the compost transport system 710 may be operatively coupled to the compost housing 150. In some embodiments, the base 711 of the compost transport system 710 may additionally be operatively coupled to the compost transport diverter 751. In one embodiment, the compost transport system 710 may comprise two continuous container transport assemblies 712, wherein the continuous container transport assemblies 712 are configured to allow one or more containers 713 to move along the continuous path. The two container transport assemblies 712 may be any type of support (e.g., a rail such as a rod, bar, track, scaffolding, beam, or the like) capable of allowing one or more containers 713 to move along the continuous path defined by the container transport assemblies 712. In one embodiment, only one container transport assembly 712 is provided. The containers 713 may be any capsule, pod, shell, bucket, or casing configured to receive compost, confine the compost, and deliver the compost to the depositor 120.

A depositor 120 may be operatively coupled to the top 714 of the container transport system 710 and may be configured to receive the compost (e.g., soil) from the one or more containers 713. In this representative embodiment, the depositor 120 comprises a depositor conveyor 121, a depositor diverter 122, a depositor plow 123, and a depositor seeder 124. In some embodiments, the depositor conveyor 121, the depositor diverter 122, the depositor plow 123, and the depositor seeder 124 may be enclosed within (and therefore comprise) a single depositor 120. In other embodiments, one or more of the depositor conveyor 121, the depositor diverter 122, the depositor plow 123, and the depositor seeder 124 may be separated from the others, and therefore reside within a separate depositor 120. For example purposes, each of the depositor elements shall be considered one single depositor 120 throughout FIGS. 7, 8, 11, and 12.

The depositor conveyor 121 may be any mechanism capable of transporting soil across the depositor 120. The depositor diverter 122 (e.g., a curved wall, a slanted wall, etc.) may be any mechanism capable of diverting soil from the depositor conveyor 121 onto the planting material 110 below (not shown). The depositor diverter 122 shown in FIGS. 7 and 8 comprises a curved wall operatively coupled to the depositor conveyor 121 and configured to divert compost from the depositor conveyor 121 onto the planting material 110 below (not shown). The depositor plow 123 (e.g., plow, cultivator, rake, tiller, etc.) may be any mechanism configured to adjust deposited soil into an orientation receptive to planting seeds for crop growth. In some embodiments, the depositor plow 123 may comprise a stationary strut with multiple prongs extending downward such that the soil may be separated into rows as the planting material 110 travels underneath the depositor plow. In another embodiment, and as illustrated in FIGS. 7 and 8, the depositor plow 123 may comprise a rotational strut with multiple disks extending therefrom, the strut and/or the disks rotating such that soil passing through the depositor plow may be separated into rows.

Finally, the depositor seeder 124 may comprise a strut with multiple holes beneath the strut, configured such that seeds may travel across the strut and be deposited onto the soil passing beneath the depositor seeder 124. In some embodiments, the rate at which the depositor seeder 124 deposits seeds may vary at different points across the strut. As described before, since the linear speed of the planting material 120 is varied across the length of the depositor seeder 124, the depositor seeder may deposit seeds at a faster rate at distances farther away from the center of the apparatus 100. In some embodiments, the depositor seeder 124 may also deposit fertilizer and/or water onto the soil and planting material 110.

To highlight the cyclical nature of the apparatus and the elements shown in FIGS. 7 and 8, the soil and seeds deposited by the depositor 120 will travel down the cyclical path defined by the inner material transport assembly 105 and the outer material transport assembly 106, atop the planting material 110, until the soil and mature crops reach the harvester 130. The harvester 139 may harvest the crops and discard the soil and plant remnants as compost into the compost conveyor 151. The compost conveyor may transport the compost through the compost mulcher 720 before the compost conveyor diverter 730 pushes the compost into the compost housing 150. As more compost enters the compost housing 150, this compost travels toward the compost transport system 710 while occasionally being tilled by the compost cultivator 740. When the compost reaches the compost transport system 710, the compost transport diverter 751 diverts the compost into a compost container 713. The container 713 filled with compost then travels up the conduit 104, along the compost transport assemblies 712, and deposits the compost (now referred to as soil or compost soil) onto the depositor conveyor 121. The depositor conveyor 121 transports the soil outward, away from the conduit 104 until the depositor diverter 122 pushes the soil off of the depositor conveyor 121 and onto the planting material 110. The soil then travels through the depositor plow 123, being separated into rows ready for planting. Finally, the depositor seeder 124 deposits seeds onto (or into) the soil and the process is repeated.

FIG. 9 illustrates an example embodiment of the invention, specifically a close-up perspective view of the compost housing 150, the compost conveyor 151, the compost mulcher 720, the compost conveyor diverter 730, one of the compost sliding rails 742 of the compost cultivator 740, and the compost cultivator 740.

FIG. 10 illustrates an example embodiment of the invention, specifically a close-up perspective view of the compost housing 150, the compost conveyor 151, the compost conveyor diverter 730, the sliding bars 741, 742 of the compost cultivator 740, the compost cultivator 740, the compost housing conveyor 750, the compost housing transport diverter 751, the compost transport assemblies 712, and the containers 713.

FIGS. 11 and 12 illustrate an example embodiment of the invention, specifically a close-up perspective view of the compost transport assemblies 712, the containers 713, the depositor conveyor 121, the depositor diverter 122, the depositor plow 123, and the depositor seeder 124.

In some embodiments of the invention, the helical path can be set to move at a rate depending on the crop that is being gown, such that when a row of the crops reaches the bottom of the apparatus they are ready for harvesting. In other embodiments the rate at which the helical path moves may be variable depending on how each row of crops is growing. In some embodiments of the invention the location of material transport assemblies 105, 106 may be adjusted such that different types of crops may be grown based on the height of the crops during different times of growth. For example, near the beginning of the path the space between an upper path and a lower path below the upper path is the smallest because only the seeds or a small part of the crop is sticking out of the ground. The spaces between upper and lower paths increase gradually until the path reaches the bottom, such that the crops being grown have enough height to grow, but also to create the most surface area as possible.

FIG. 13 is another embodiment of the invention illustrating a perspective side view of an inner portion of a helical apparatus 1300. It is understood that this inner portion 1300 illustrates a select portion of the overall helical apparatus, and may incorporate all or some of the previously described components from other embodiments, such as the harvester 130, the harvester conveyor 131, the apparatus base 140, the compost housing 150, the compost conveyor 151, etc. It is also understood that any of these previously described components may be appear more than once in some embodiments. The inner portion 1300 is defined by two helical paths 1310, 1320 between which the planting material 110 may be located. While two helical paths 1310, 1320 are shown in FIG. 13, any number of helical paths may be included in an apparatus (e.g., one path, two paths as shown in FIG. 13, three paths as shown in FIG. 14, four paths, five paths, or more). As such, it should be understood that the apparatus illustrated with respect to FIGS. 1-12 may include the returns systems 1350, 1360 that allow for the return of the planting material under one or more paths, as described in further detail below.

The helical paths 1310 and 1320 may move at either the same or different speeds depending on the application, and may be utilized to cultivate different crops, which may be harvested using one or more harvesters 130 attached to transport assemblies 105, 105A, and 106. Additionally, in some embodiments, one or more of the helical paths may be stationary. In some such embodiments, a depositor 120 and/or a harvester 130 may be operatively coupled to one or more of the inner and outer material transport assemblies 105, 106, and 105A, such that the depositor 120 and/or harvester 130 may travel along the helical paths to deposit soil, seeds, or fertilizer, or to harvest crops that have grown upon the planting material. As such, each path (e.g., two, three, four, etc.) may have its own harvester 130 and/or depositor 120, or a single harvester 130 and/or depositor 120 may be used for multiple paths (e.g., two, three, four, etc.)

In some embodiments of the apparatus 1300, the planting material 110 on the helical path 1310 moves independently of the planting material 110 on the helical path 1320. Furthermore, and as shown in FIG. 13, the planting material 110 for each helical path 1310 and 1320 may wrap around return systems 1350, 136, and reengage with the material transport assemblies 105, 105A and/or 106 such that the planting material 110 forms a continuous loop around the helical path. In some embodiments the return system 1350, 1360 may include rollers, slots, or may include the same elements that are used in the transport assemblies to return the planning material 110 back under the path from which it came. For example, the planting material 110 in the outer-most helical path 1320 may travel from a top of the apparatus, down the apparatus in the helical path 1320, travel around a return system 1360 (e.g., a rolling member, or the like), and travel upward through the helical path 1320 in the opposite direction of the downward-moving plating material 110, until it reaches a return system 1350 (e.g., a rolling member, or the like) at the top of the apparatus, where the planting material 110 then wraps back around the return system 1350 to begin its downward movement again. In some embodiments, the planting material 110 does not reengage with the material transport assemblies 105, 105A, and/or 106, but instead is generally suspended beneath the material transport assemblies 105, 105A and/or 106, or is located on a separate return transport assemblies (not illustrated) located below the transport assemblies 105, 105A back to the top of the apparatus 1300.

The return systems 1350, 1360 (e.g., rolling members, or the like) may be stationary and including railings that allow the planting material 110 to move around the return system such that the planting material 110 is traveling back up the helical path that it originally travelled down. Additionally or alternatively, one or more return systems (e.g., rolling members, or the like) may be powered, for example, mechanically rotating one or more rollers causes the planting material 110 to move along the apparatus in its configured helical path 1310 or 1320. For example, in some embodiments, the planting material is engaged by the rollers such that as the rollers and rotate, friction between the planting material 110 and the rollers provide a force on the planting material 110 that causes the planting material 110 to move throughout the entire apparatus. In some aspects of the invention additional rollers may be located between the planting material 110 that is moving downwardly in the helical path and the planting material 110 that is moving upwardly in the helical path.

In embodiments the planting material 110 on the inner-most helical path 1310 moves at a different speed than the planting material 110 on the outer-most helical path 1320. As such, the respective return systems 1350, 1360 (e.g., rolling members, or the like) associated with each helical path 1310, 1320 may operate (e.g., rotate, or the like) at different speeds and/or provide a varying force on the planting material 110 to achieve the differences in planting material 110 speed between the two helical paths 1310 and 1320.

By wrapping the planting material 110 back underneath the same helical path that the planting material 110 follows on its way down the helical apparatus 1300, the entire apparatus 1300 can run continuously without having to change out sections of the planting material 110, and space is saved by not requiring the planting material 110 to travel outside of the apparatus 1300 to return to the top of the apparatus 1300.

In some embodiments of the apparatus 1300 (not shown), a modified return system (e.g., rolling member, or the like) at the bottom of a helical path 1310 or 1320 may accept the planting material 110 as it reaches the end of its helical path 1310 or 1320, and rolls the planting material 110 up, like a carpet. In some such embodiments, the planting material 110 may be in removable and replaceable sections, such that when one section is completely rolled up by the modified roller, it may be detached from the rest of the planting material 110 in the apparatus 1300, and the rolled-up section of planting material may be more-easily transported back to the top of the planting apparatus for reattachment. Furthermore, the re-attachment process may include a spindle or other rotatable roll holder that allows the rolled-up section of the planting material 110 to enter the helical path 1310 or 1320 directly from its rolled-up state.

In other embodiments of the invention, the return systems 1350, 1360 may allow for slack in the planting material 110, and thus, before the planting material begins its return it may be inspected, repaired, and/or replaced, if needed.

Of course, each helical path 1310 and 1320 may vary in which type of return system is used, the speed of the planting material 110, the direction of movement for the planting material (e.g., downwards or upwards), and whether the planting material 110 moves through the apparatus at all (e.g., some planting material may be stationary in a path, while other planting material moves).

In one embodiment, the apparatus contains an inner material transport assembly 105, an outer material transport assembly 106, and at least one supplementary transport assembly 105A. Alternatively stated, each path may have an inner material transport assembly 105 and an outer material transport assembly 106, and the outer material transport assembly 105A of one path may be the same as the inner transport assembly 105A of another path (or otherwise be coupled together as discussed below).

Like the material transport assemblies 105 and 106 previously described herein, in some embodiments, the supplementary material transport assembly 105A comprises a single rail, multiple rails, one or more "C-beam" railings, or other like rail, and material couplings 301 and coupling movement devices 302 that may be operatively coupled to the material transport assembly 105A. Moreover, the supplementary material transport assembly 105A may be operatively coupled to the planting material 110, so its location and orientation in conjunction with either inner material transport assembly 105 or outer material transport assembly 106 determines the location and orientation of the planting material 110. It is understood that the supplementary transport assembly 105A may contain a dual-facing design such that the rail or rails contained within the supplementary material transport assembly 105A can support independent movement of each helical path. For example, in some embodiments, one side of the supplemental material transport assembly 105A may act as an outer material transport assembly, like the outer material transport assembly 106, for the inner-most helical path of planting material. Additionally, the opposite side of the supplemental material transport assembly 105A may act as an inner material transport assembly, like the inner material transport assembly 105, for the outer-most helical path of the planting material. In some embodiments, the supplemental material transport assembly 105A comprises two separate railing beams, with one railing acting as an outer transport assembly like the outer transport assembly 106 for the inner-most helical path, and the other railing acting as an inner transport assembly like the inner transport assembly 105 for the outer-most helical path.

In some embodiments of the invention, the inner portion of a helical apparatus 1300 contains outer support members 111 and inner support members 111A (otherwise called auxiliary support members). The inner support members 111A may be placed concentrically with respect to the outer support members 111 and central support member 103 along the inner radius of the helical apparatus 1300 and along the path of the supplemental transport assembly 105A. In addition, auxiliary support members may be placed in any other area within the radius of the helical apparatus, and may be used as support for other components, such as the depositor 120 and/or the harvester 130.

As previously stated, the harvester 130 may be any mechanism capable of harvesting crops from the planting material 110 as the planting material 110 travels underneath, or through, the harvester 130. In certain embodiments that contain multiple paths, at least two harvesters 130 may be included so that different crops may be harvested independently of one another. The harvester 130 may be operatively coupled at one end to the conduit 104 (or the inner material transport assembly 105, or supplementary material transport assembly 105A, or outer material transport assembly 106) and extend at least as far as the outer material transport assembly 106. In some embodiments, an outer support member 111 or inner support member 111A is operatively coupled to the harvester 130 and may provide structural support to the harvester 130. The harvester 130 is generally located at the bottom of the helical path of the planting material 110, though in some embodiments, the harvester 130 is moveable and may be placed at a different locations along the helical path of the planting material 110. The harvester 130 may be one mechanism or multiple mechanisms that accomplish the task of removing crops from the soil, depositing the soil into the compost housing 150, and transferring the harvested crops to the harvester conveyor 131. The harvester 130 may be removable and replaceable. One or more depositors 120, previously discussed herein, may be similarly positioned within the apparatus 1300.

While some embodiments of the apparatus utilize a harvester, it should be known that the crops may be harvested by hand or by animals. For example, human farmers may have access to a bottom portion of the apparatus such that they may pick the crops, use hand-held machinery to harvest the crops, sort through the crops, and the like. Additionally or alternatively, the apparatus may be used to feed livestock such as pigs, cows, goats, chickens, and the like. For example, the apparatus may be used to grow grass on a helical path such that the grass crops reach maturity at the bottom of the apparatus. The bottom of the apparatus may abut a livestock pin, a feeding area, or the like, where animals may eat the grass crops directly from the farming apparatus. In this way, a large amount of feed can regularly be produced with a relatively small footprint. Additionally, no crops will be lost due to trampling, bad weather, and other natural causes that are commonly associated with using large fields to feed livestock.

FIG. 14 is another embodiment of the invention illustrating a side view of an inner portion of a helical apparatus 1400 with three helical paths 1410, 1420, 1430. It is understood that this inner portion 1400 illustrates a select portion of the overall helical apparatus, and may incorporate one or more of all or some of the previously described components from other embodiments, such as the harvester 130, the harvester conveyor 131, the apparatus base 140, the compost housing 150, the compost conveyor 151, etc. It is also understood that any of these previously described components may be appear more than once in some embodiments. The inner portion 1400 is defined by three helical paths 1410, 1420, 1430 between which the planting material 110 may be placed. The helical paths 1410, 1420, 1430 may move at either the same or different speeds depending on the application, and may be utilized to cultivate different crops, which may be harvested using one or more harvesters 130 attached to transport assemblies 105, 105A, and 106. In one embodiment, the apparatus contains an inner material transport assembly 105, an outer material transport assembly 106, and at least two sets of supplementary transport assemblies 105A (i.e., one set between helical paths 1410, 1420, and one set between 1420, 1430). Like the material transport assemblies 105 and 106, in some embodiments, the supplementary material transport assemblies 105A each comprise a single rail, multiple rails, a "C-beam" railing, or other like rail, and material couplings 301 and coupling movement devices 302 that may be operatively coupled to the material transport assemblies 105A. Moreover, supplementary material transport assemblies 105A may be operatively coupled to the planting material 110, so their location and orientation in conjunction with either inner material transport assembly 105, outer material transport assembly 106, or other supplementary material transport assembly 105A determines the location and orientation of the planting material 110. It is understood that the supplementary transport assemblies 105A may contain a dual-facing designs such that the rail or rails contained within the supplementary material transport assemblies 105A can support independent movement of each helical path. As such, as previously discussed each path may be described as having an inner material transport assembly 105 and an outer material transport assembly 106, each of which may be a single material transport assembly, operatively coupled to another material transport assembly, and/or a dual-material transport assembly.

In some embodiments of the invention, the inner portion of a helical apparatus 1400 contains outer support members 111 and inner support members 111A. The inner support members 111A may be placed concentrically with respect to the outer support members 111 and central support member 103 along the inner radius of the helical apparatus 1400 and along the outer path of the outer-most helical path 1430 of the transport assembly. In addition, auxiliary support members may be placed concentrically in any other area within the radius of the helical apparatus, and may be used as support for other components, such as the supplementary material transports 105A, the harvester 130, or the like. As previously stated, the harvester 130 may be any mechanism capable of harvesting crops from the planting material 110 as the planting material 110 travels underneath, or through, the harvester 130. In certain embodiments that contain multiple paths, at least two harvesters 130 (e.g., two, three, four, five, or the like) may be included so that different crops may be harvested independently of one another. The harvester 130 may be operatively coupled at one end to the conduit 104 (or the inner material transport assembly 105, or supplementary material transport assembly 105A, or outer material transport assembly 106) and extend at least as far as the outer material transport assembly 106. In some embodiments, an outer support member 111 or auxiliary support member 111A is operatively coupled to the harvester 130 and may provide structural support to the harvester 130.

As described above, each of the helical paths 1410, 1420, 1430 may be stationary or moveable and may be configured differently to allow the material to return to the top of the apparatus. As such, the inner-most helical path 1410, the middle helical path 1420, and the outer-most helical path 1430 may utilize the same, similar, or different mechanisms for moving the planting material and/or depositing and harvesting crops from the planting material 110. For example, the planting material 110 on the inner-most helical path 1410 may be stationary, and a moveable depositor and a moveable harvester may travel along the helical path 1410 to deposit soil, seeds, fertilizer, water, and the like, and harvest the crops once they have grown a desired amount. Additionally, the planting material 110 in the middle helical path 1420 may be sectional in nature, such that a modified roller at the bottom of the helical path 1420 rolls the planting material 110 up for easier manual movement and reattachment at the top of the apparatus 1400. Finally, the outer-most helical path 1430 may comprise two moveable return systems 1350, 1360 (e.g., rollers, or the like), in tension with the planting material 110, where the planting material 110 returns underneath (e.g., wraps around each of the rollers, or the like) itself throughout the entire helical path 1430, such that the planting material 110 makes a continuous loop. While three helical paths 1410, 1420, and 1430 are shown in FIG. 14, any number of helical paths are envisioned, each path capable of being any width and utilizing one or more of the planting material movement and/or depositing and harvesting processes described herein.

It should be understood that regardless of how the material is returned by the return systems 1350, 1360, the planning material 110 may be returned to the beginning of the growing apparatus underneath the planting material 110 on which the crops are grown. As such, the planning material may travel down the path and return under the path to adjacent the top of the apparatus, or the planting material may travel up the path and return under to adjacent the bottom of the apparatus. Regardless of the configuration, the paths may create a continuous loop of the planting material.

In some embodiments, the footprint of the apparatus may be of any size, such as a quarter, a third, a half, two-thirds, three-quarters, or a whole acre, or greater than an acre. In other embodiments of the invention the size of the apparatus may be between any of these vales, overlapping these values, or be outside of these values. Depending on the height of the apparatus, the surface area of the planting material may be 10, 20, 30, 40, 50, 75, 100, or more times, or range from 2 to 100 times or more, of the size of the footprint of the land on which the apparatus is located. In other embodiments of the invention the size of the apparatus may be between any of these vales, overlapping these values, or be outside of these values.

Additionally, the crops grown in the present invention will also grow faster than the crops grown under normal conditions on farmland because the closed system allows the user to maintain the desired conditions for each type of crop that is grown in it, throughout the grow cycle, from germination to harvest. Due to the temperature maintaining ability of the apparatus, crops may be able to grow all year round. With respect to some crops, the present invention may allow for 3-8 growing seasons (or another range within, outside, or overlapping this range), depending on the type of crop, where as traditional farming on land provides only one. The system also allows the user to add aquaponics features that can utilize rich nutrients from fish digestion, which has been known to increase growth of plants by a factor of 2 in many cases. The system also has the ability to eliminate or reduce the use of, costs of, and damage of harmful pesticides, as well as eliminate or reduce the need for genetically modified plants that are engineered to resist drought, extreme conditions, or modified growth rates, or the like. As such, the rate at which the crops grow in this environment may be approximately 1.5, 2, 3, 4, 5, or the like, or range from 1.5 to 4, or more times (or another range within, outside, or overlapping this range) as crops grown on farmland.

Crops can also be planted more densely due to more available nutrients in the soil and water which is constricted on traditional farmland. This system also reduces the use of burning fossil fuels and total carbon footprint required to harvest and transport crops to the end consumer because the apparatus can be set up in any rural or urban footprint and produce many more crops than could be farmed using the footprint of the land.

The amount of crops that can be grown using the apparatus over the amount of crops that can be gown on the same footprint of land may be at least 50, 75, 100, or more (or any range that is within, outside of, or above these values), depending on the number of levels in the apparatus, type of crop, footprint of planting material, fertilizers, temperature regulation, watering cycles, lighting (e.g., types, quantity and cycles of lighting), or the like. While FIGS. 1-12 illustrate a few embodiments of the invention, several alternative designs are considered as well. For example, in one embodiment, the apparatus 100 may not have a return support assembly 201. In such an embodiment, the planting material 110 may be comprised of removable and attachable sections. These sections, after passing through the harvester 130, may be removed from the trailing section, and re-attached to the rest of the planting material 110 at the top of the helical path. This design may be especially useful when the planting material 110 is not very flexible or stretchable, and passing the planting material 110 along the return support assembly 201 would cause damage to the planting material 110. Additionally, the soil could still be continuously run through the apparatus 100 as described earlier, so crop production does not slow down or stop.

In another embodiment of the invention, the planting material 110 may move upwardly (e.g., upwardly in the helix) following the same path as described above in which the planting material 110 moved downwardly. In such an embodiment, the planting material 110 may begin near the apparatus bottom, travel upwardly, end near the top (e.g., the crops are harvested near the top), and be returned to the bottom (e.g., in a continuous motion). In this embodiment, the devices and use of each may occur in the opposite direction, such as the crops are planted at the bottom and harvested at the top.

In some embodiments, the apparatus may be located within the ground instead of above the ground, such that access to the apparatus may be easier and the geothermal properties of the ground may be utilized to improve temperature control, or the like.

In other embodiments of the invention, there may be rollers, wheels, or other planting material movement mechanisms that are not attached to the planting material, which function to allow the planting material 110 to roll over the planting material 110, while also supporting the planting material. These planting material movement mechanisms may be spaced evenly at various areas throughout the helix to decrease the span and decrease potential sagging of planting material due to the weight of the grow mediums, crops, and/or water.

Another alternative design involves using two layers of planting material 110. In such an embodiment, the two layers may be attached to the same inner and outer material transport assemblies 105, 106 or a second set of inner and outer material transport assemblies 105, 106. In this design, the soil may be deposited between the two planting material 110 layers. The two planting material 110 layers may be comprised of different material. For example, the bottom layer may be a sturdy fabric while the top layer is a light mesh material that allows parts of a plant to grow upwards, through the holes of the mesh. In such an embodiment, potatoes and other crops that grow below the ground may grow between the two planting material 110 layers.

In one embodiment of the invention, the planting material 110 does not move down the helical path at all, instead the planting material 110 stays stationary, in the helical orientation, while the depositor 120 and the harvester 130 travel along the helical path, planting and harvesting the crops as they move along. In such an embodiment, the depositor 120 and the harvester 130 may be in continuous motion, returning to the top of the helical path via the return support assemblies 201. In another embodiment, a user may detach the depositor 120 and the harvester 130 and transport them to the top of the helical path manually.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for a vertical farming structure through which crops are allowed to grow as the crops move, the apparatus comprising:
   one or more support members;
   an inner material transport assembly operatively coupled to the one or more support members;
   an outer material transport assembly operatively coupled to the one or more support members;
   one or more supplementary transport assemblies operatively coupled to the one or more support members, wherein the inner material transport assembly, the one or more supplementary transport assemblies, and the outer material transport assembly define two or more paths; and
   a planting material comprising two or more planting material portions, wherein each of the two or more planting material portions are operatively coupled to the inner material transport assembly, the one or more supplementary transport assemblies, or the outer material transport assembly to form the two or more paths, wherein the two or more paths for the planting material are separate paths that move independently of each other through use of the inner material transport assembly, the one or more supplementary transport assemblies, and the outer material transport assembly, and wherein the planting material is flexible, such that the planting material may be deformed, and is configured to support the crops as the crops grow; and
   a depositor or a harvester positioned over at least a portion of the planting material, wherein the depositor is configured to deposit soil, seeds, or the crops on at least the portion of the planting material, wherein the harvester is configured to harvest the crops from at least the portion of the planting material;
   wherein the crops are planted in a first location within the apparatus, move as the inner material transport assembly, the one or more supplementary transport assemblies; and the outer transport assembly allow the planting material to move, and are ready for harvesting in a second location within the apparatus.

2. The apparatus of claim 1, wherein the apparatus is formed in a helical configuration such that the inner material transport assembly and the outer material transport assembly extend the planting material in the helical configuration from adjacent an apparatus top to adjacent an apparatus bottom.

3. The apparatus of claim 2, wherein the planting material wraps back underneath itself adjacent the apparatus bottom and returns along the helical configuration to the apparatus top, thereby forming a continuous path throughout the apparatus.

4. The apparatus of claim 1, wherein at least one of the inner material transport assembly, the one or more supplementary transport assemblies, or the outer material transport assembly comprise first cable members, wherein the planting material comprise second cable members, and wherein the first cable members and second cable members are operatively coupled by a cable in order to operatively couple at least one edge of the planting material to the inner material transport assembly, the one or more supplementary transport assemblies, or the outer material transport assembly, and wherein the cable members and the cable are configured to move the planting material along the inner material transport assembly, the one or more supplementary transport assemblies, and the outer material transport assembly from the first location within the apparatus to the second location within the apparatus.

5. The apparatus of claim 1, wherein at least one of the inner material transport assembly, the one or more supplementary transport assemblies, and outer material transport assembly comprise clips, rollers, and gears operatively coupled together, and wherein the clips are operatively coupled to at least one of an inner edge or an outer edge of the planting material or the two or more planting material portions, and wherein the clips, the rollers, and the gears are configured to move the planting material along the inner material transport assembly, the one or more supplementary transport assemblies, and the outer material transport assembly from the first location within the apparatus to the second location within the apparatus.

6. The apparatus of claim 1, wherein the apparatus further comprises:
one or more top return systems located adjacent an apparatus top; and
one or more bottom return systems located adjacent an apparatus bottom,
wherein the planting material wraps around the one or more top return systems and the one or more bottom return systems, thereby wrapping back underneath itself and forming a continuous path.

7. The apparatus of claim 6, wherein the one or more top return systems and the one or more bottom return systems comprise rolling members configured to rotate with the planting material as the planting material wraps back underneath itself.

8. The apparatus of claim 1, wherein at least one of the depositor or the harvester is configured to be moveable over the planting material.

9. The apparatus of claim 1, wherein the planting material comprises removable and attachable sections such that the removable and attachable sections of the planting material may be removed from the apparatus and re-attached within the apparatus.

10. A method for growing crops in a vertical farming structure as the crops move, the method comprising:
planting seeds for the crops or the crops on a planting material at a first location within an apparatus, wherein the apparatus comprises:
one or more support members;
an inner material transport assembly operatively coupled to the one or more support members;
an outer material transport assembly operatively coupled to the one or more support members;
one or more supplementary transport assemblies operatively coupled to the one or more support members, wherein the inner material transport assembly, the one or more supplementary transport assemblies, and the outer material transport assembly define two or more paths; and
wherein the planting material comprises two or more planting material portions, wherein each of the two or more planting material portions are operatively coupled to the inner material transport assembly, the one or more supplementary transport assemblies, or the outer material transport assembly to form the two or more paths, wherein the two or more paths for the planting material are separate paths that move independently of each other through use of the inner material transport assembly, the one or more supplementary transport assemblies, and the outer material transport assembly, and wherein the planting material is flexible, such that the planting material may be deformed, and is configured to support the crops as the crops grow;-moving the planting material with the crops along the inner material transport assembly, the one or more supplementary transport assemblies, and the outer material transport assembly; and
harvesting the crops at a second location within the apparatus after the crops have grown.

11. The method of claim 10, wherein the apparatus is formed in a helical configuration such that the inner material transport assembly and the outer material transport assembly extend the planting material in the helical configuration from adjacent an apparatus top to adjacent an apparatus bottom.

12. The method of claim 11, wherein the planting material wraps back underneath itself adjacent the apparatus bottom and returns along the helical configuration to the apparatus top, thereby forming a continuous path throughout the apparatus.

13. The method of claim 10, wherein at least one of the inner material transport assembly, the one or more supplementary transport assemblies, or the outer material transport assembly comprise first cable members, wherein the planting material comprise second cable members, and wherein the first cable members and second cable members are operatively coupled by a cable in order to operatively couple at least one edge of the planting material to the inner material transport assembly, the one or more supplementary transport assemblies, or the outer material transport assembly, and wherein the cable members and the cable are configured to move the planting material along the inner material transport assembly, the one or more supplementary transport assemblies, and the outer material transport assembly from the first location within the apparatus to the second location within the apparatus.

14. The method of claim 10, wherein at least one of the inner material transport assembly, the one or more supplementary transport assemblies, and outer material transport assembly comprise clips, rollers, and gears operatively coupled together, and wherein the clips are operatively coupled to at least one of an inner edge or an outer edge of the planting material or the two or more planting material portions, and wherein the clips, the rollers, and the gears are configured to move the planting material along the inner material transport assembly, the one or more supplementary transport assemblies, and the outer material transport assembly from the first location within the apparatus to the second location within the apparatus.

15. The method of claim 10, wherein the apparatus further comprises:
one or more top return systems located adjacent an apparatus top; and
one or more bottom return systems located adjacent an apparatus bottom, wherein the planting material wraps around the one or more top return systems and the one or more bottom return systems, thereby wrapping back underneath itself and forming a continuous path.

16. The method of claim 15, wherein the one or more top return systems and the one or more bottom return systems comprise rolling members configured to rotate with the planting material as the planting material wraps back underneath itself.

17. The method of claim 10, wherein the apparatus further comprises:
a depositor positioned over at least a portion of the planting material, wherein the depositor is configured to deposit soil, the seeds, or the crops on at least the portion of the planting material, and wherein the depositor is configured to be stationary or moveable over the planting material; and a harvester positioned over at least a portion of the planting material, wherein the harvester is configured to harvest the crops from the planting material, and wherein the harvester is configured to be stationary or moveable over the planting material.

18. An apparatus for a vertical farming structure through which crops are allowed to grow as the crops move, the apparatus comprising:

one or more support members;

an inner material transport assembly operatively coupled to the one or more support members;

an outer material transport assembly operatively coupled to the one or more support members;

one or more supplementary transport assemblies operatively coupled to the one or more support members; and a planting material comprising two or more planting material portions, wherein each planting material portion of the two or more planting material portions is operatively coupled to the inner material transport assembly, the one or more supplementary transport assemblies, or the outer material transport assembly, wherein the inner material transport assembly, the one or more supplementary transport assemblies, and the outer material transport assembly define two or more paths for the two or more planting material portions, wherein the two or more paths for the planting material are separate paths that move independently of each other through use of the inner material transport assembly, the one or more supplementary transport assemblies, and the outer material transport assembly, and wherein the planting material is configured to support the crops as the crops grow.

19. The apparatus of claim 18, wherein the planting material wraps back underneath itself to form a continuous path.

20. The apparatus of claim 18, wherein the planting material comprises removable and attachable sections such that the removable and attachable sections of the planting material may be removed from the apparatus and re-attached within the apparatus.

\* \* \* \* \*